United States Patent
Nakagawa et al.

[19]

[11] Patent Number: 5,932,871
[45] Date of Patent: Aug. 3, 1999

[54] MICROSCOPE HAVING A CONFOCAL POINT AND A NON-CONFOCAL POINT, AND A CONFOCAL POINT DETECT METHOD APPLIED THERETO

[75] Inventors: Shuji Nakagawa; Akihiro Kitahara; Asao Uenodai, all of Tokyo, Japan

[73] Assignee: Olympus Optical Co., Ltd., Tokyo, Japan

[21] Appl. No.: 08/744,752

[22] Filed: Nov. 6, 1996

[30] Foreign Application Priority Data

| Nov. 8, 1995 | [JP] | Japan | 7-289944 |
| Feb. 14, 1996 | [JP] | Japan | 8-027009 |
| Oct. 1, 1996 | [JP] | Japan | 8-260848 |

[51] Int. Cl.⁶ ............ G02B 7/28; G02B 21/00; G02B 26/10
[52] U.S. Cl. .......... 250/201.3; 250/234; 359/389; 359/393
[58] Field of Search ............ 250/201.3, 216, 250/234, 235; 359/201, 368, 283, 385, 388, 389, 393

[56] References Cited

U.S. PATENT DOCUMENTS

| 4,595,271 | 6/1986 | Suda et al. | 250/201.3 |
| 4,958,920 | 9/1990 | Jorgens et al. | 250/201.3 |
| 5,084,612 | 1/1992 | Iwasaki et al. | 250/201.3 |
| 5,132,526 | 7/1992 | Iwasaki et al. | 359/368 |
| 5,260,569 | 11/1993 | Kimura | 359/368 |
| 5,537,247 | 7/1996 | Xiao | 359/368 |
| 5,760,950 | 6/1998 | Maly et al. | 359/368 |

FOREIGN PATENT DOCUMENTS

| 61-219919 | 9/1986 | Japan . |
| 4-61334 | 9/1992 | Japan . |

OTHER PUBLICATIONS

T. Wilson et al; "Theory and Practice of Scanning Optical Microscopy"; 1984; pp. 123–126; Academic Press.

*Primary Examiner*—Edward P. Westin
*Assistant Examiner*—John R Lee
*Attorney, Agent, or Firm*—Frishauf, Holtz, Goodman, Langer & Chick

[57] ABSTRACT

A microscope includes a light source, an objective lens for converging light emitted from the light source onto a sample, and an optical detector for detecting either light from the sample via a confocal point diaphragm or light from the sample which does not pass through the confocal point diaphragm. A range of a focusing point is detected in accordance with the light which does not pass through the confocal diaphragm, and the focusing point is then detected in accordance with the light detected via the confocal point diaphragm in the detected range of the focusing point.

13 Claims, 23 Drawing Sheets

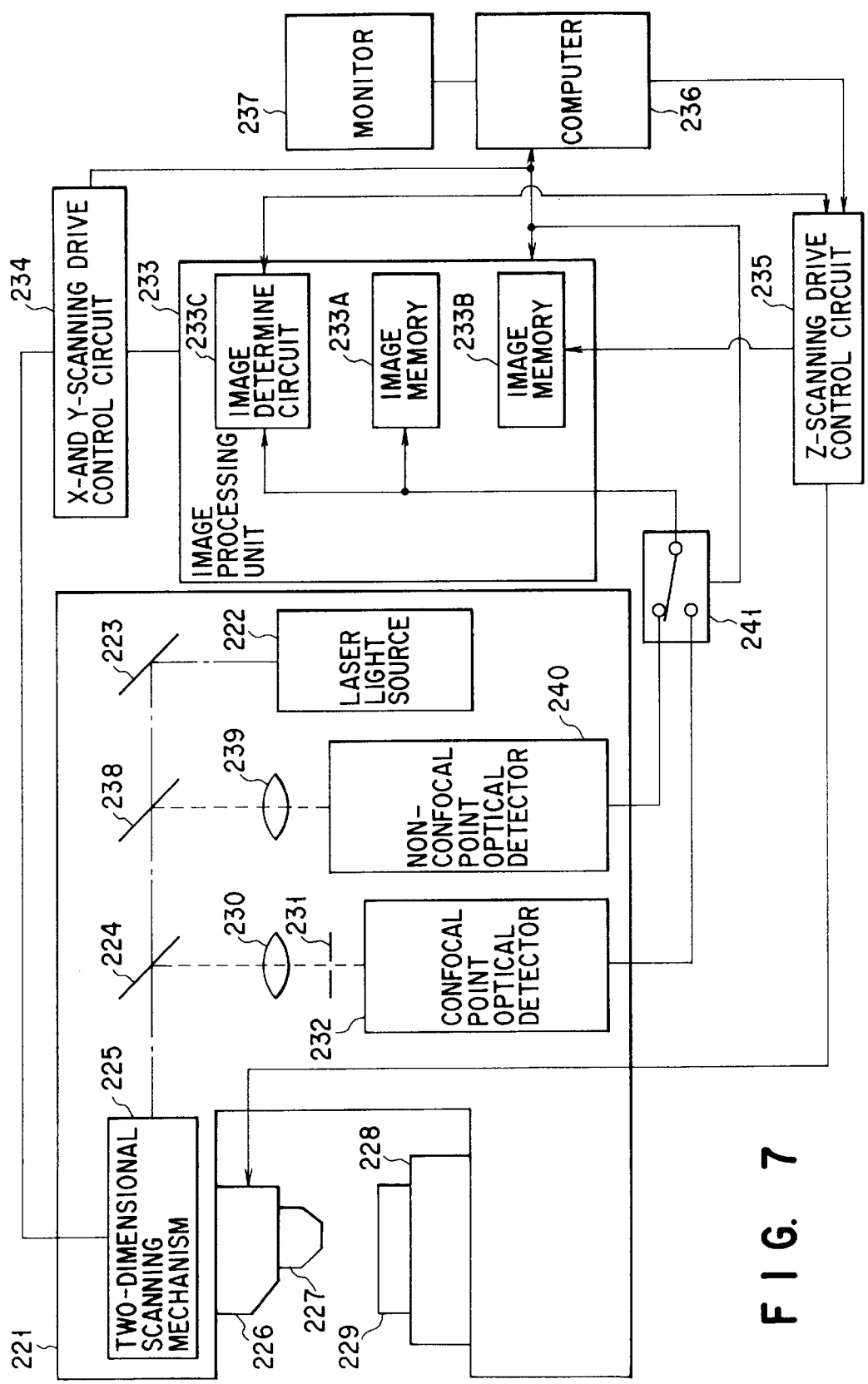
F I G. 7

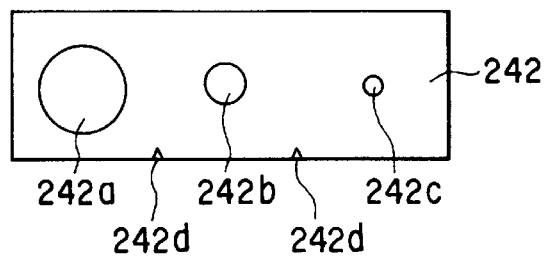
F I G. 10
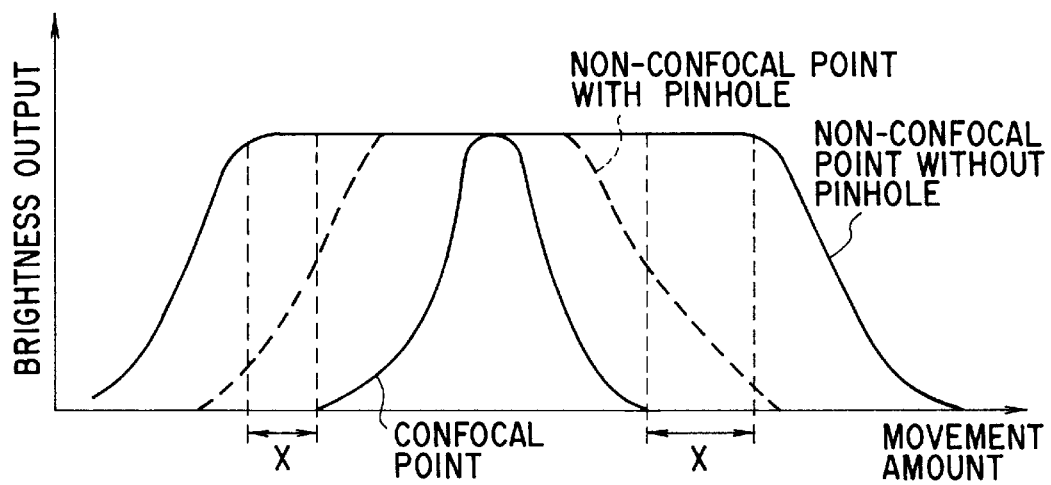
F I G. 11
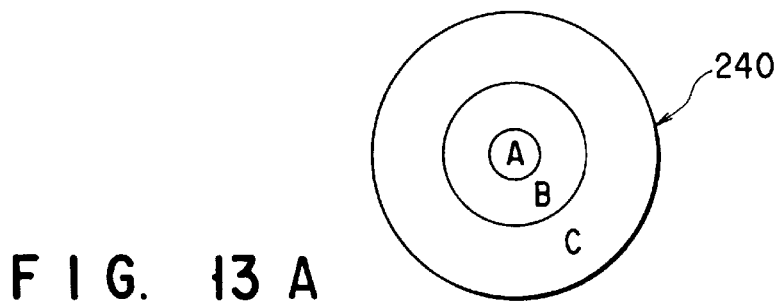
F I G. 13 A
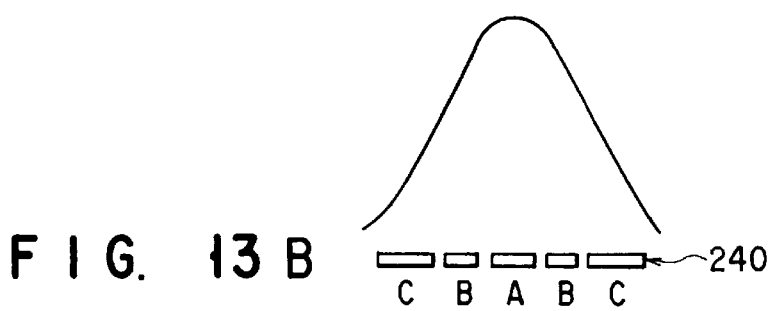
F I G. 13 B

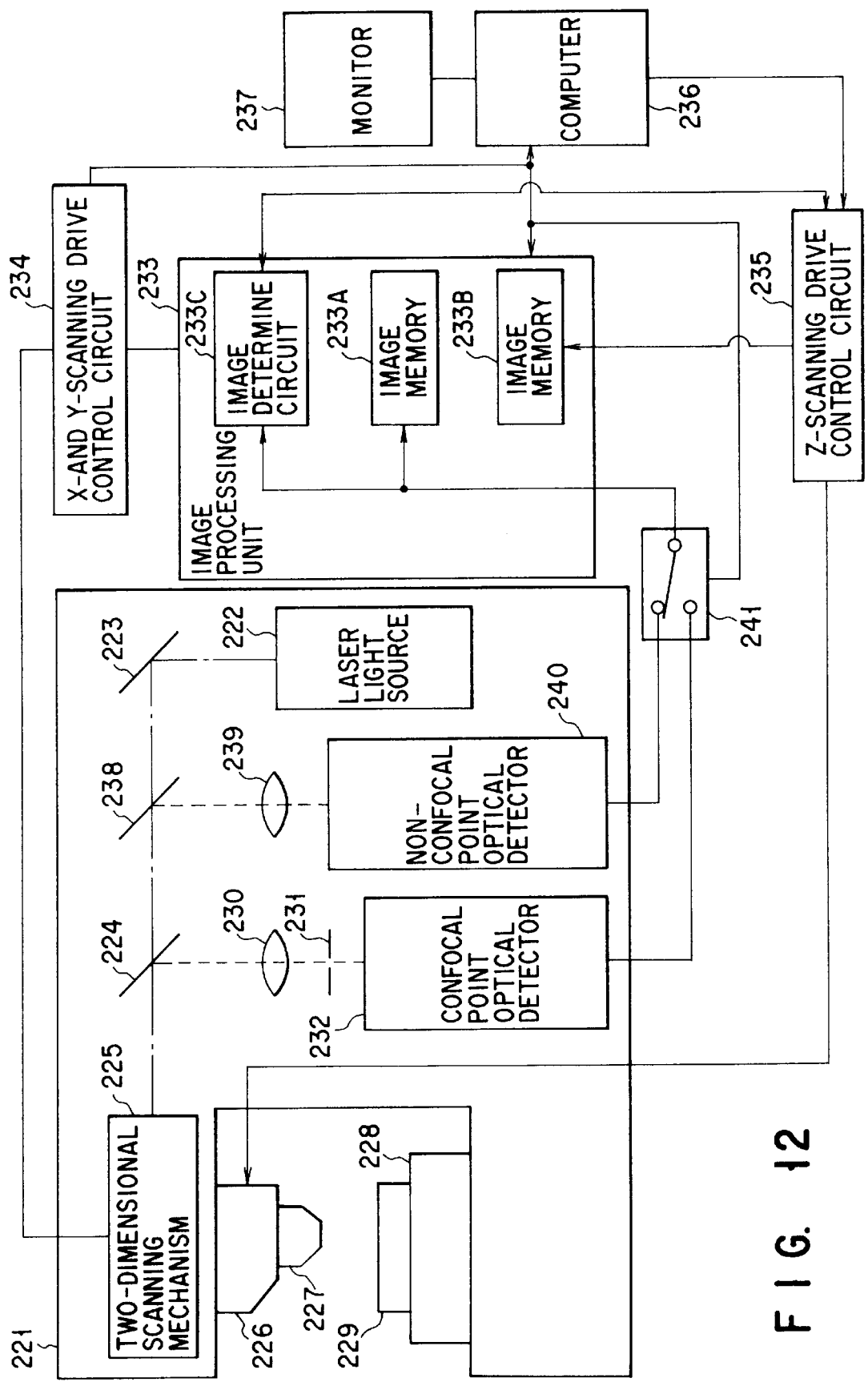
F I G. 12

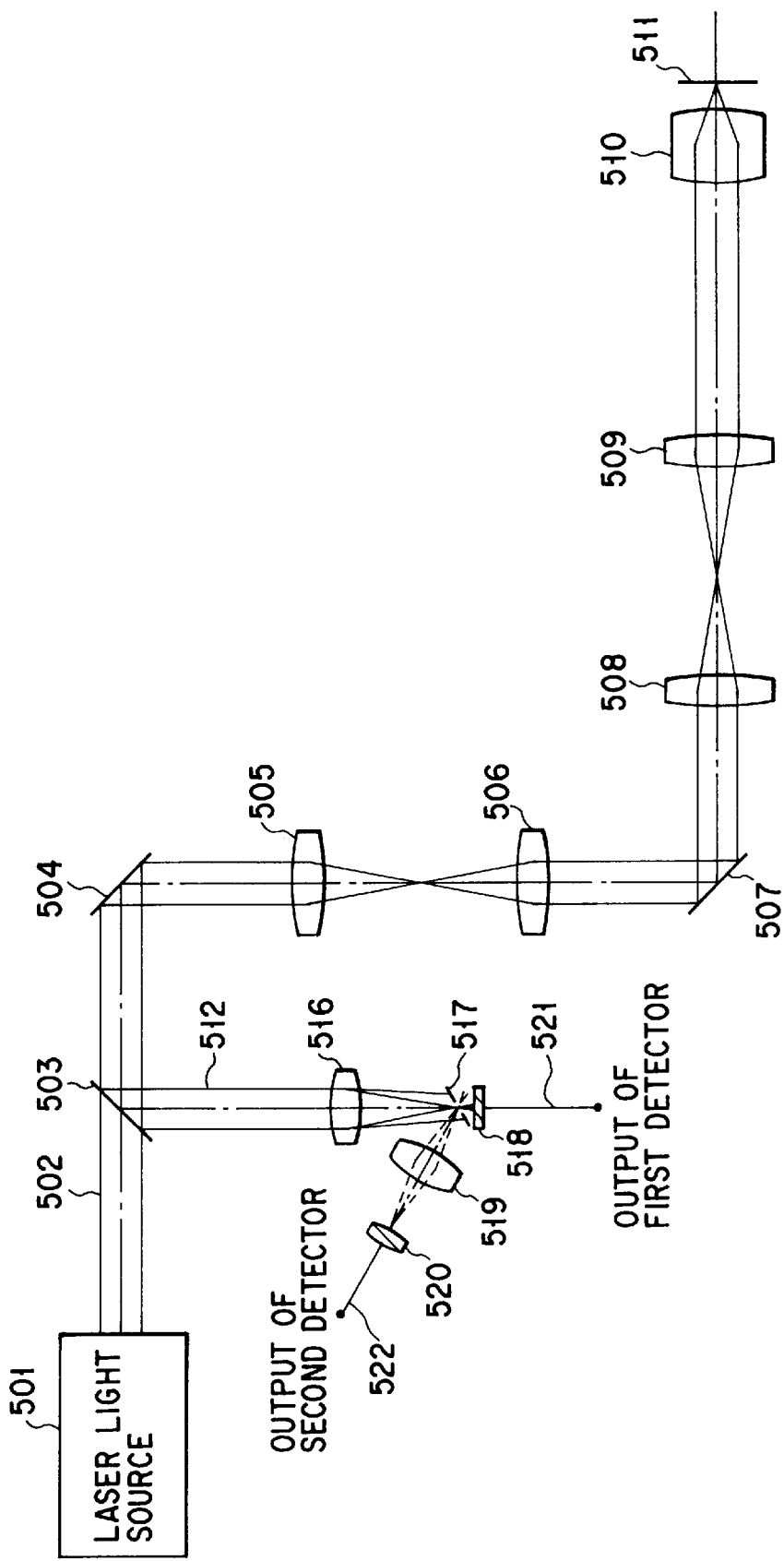
F I G. 22

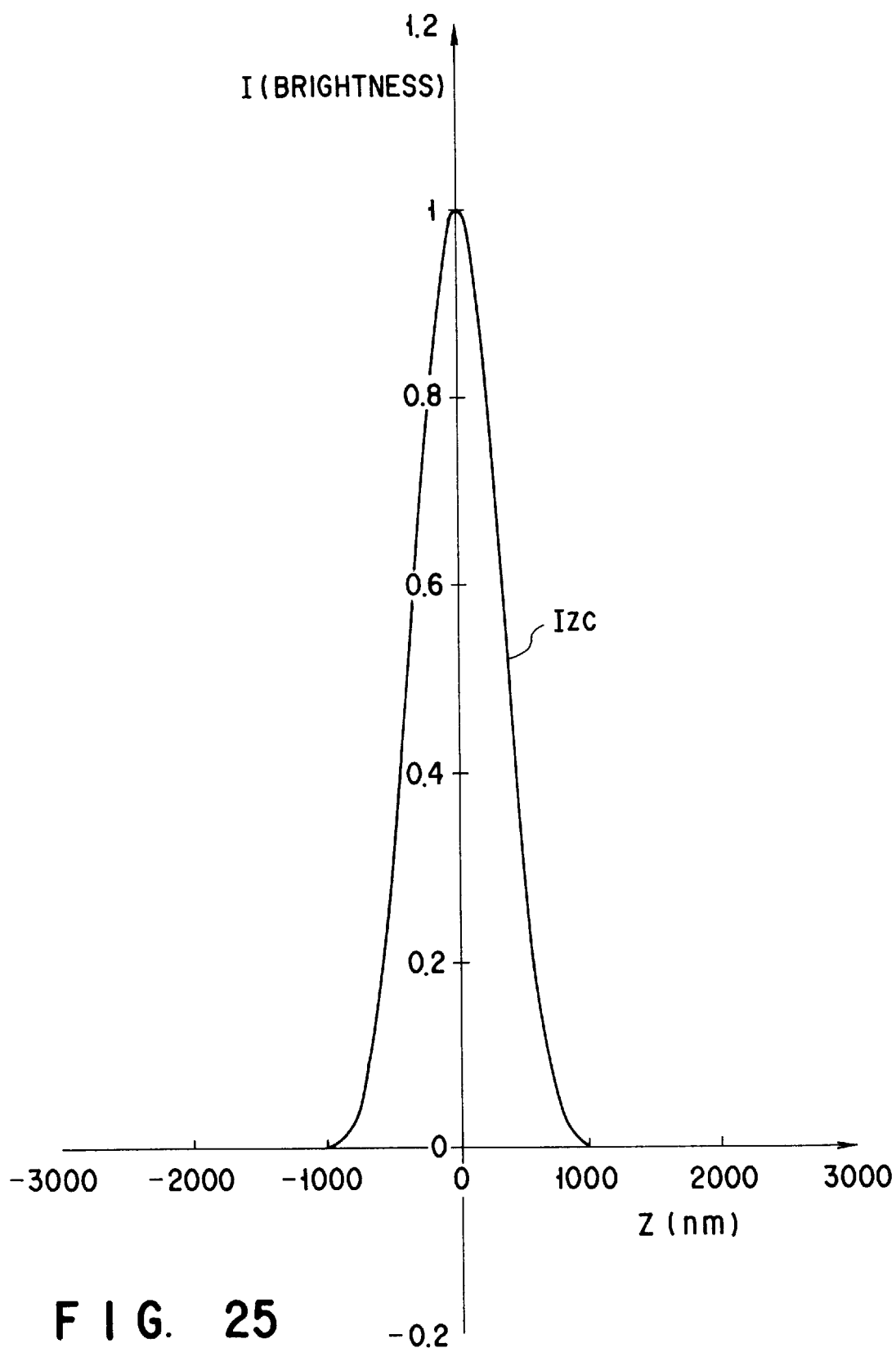
F I G. 25

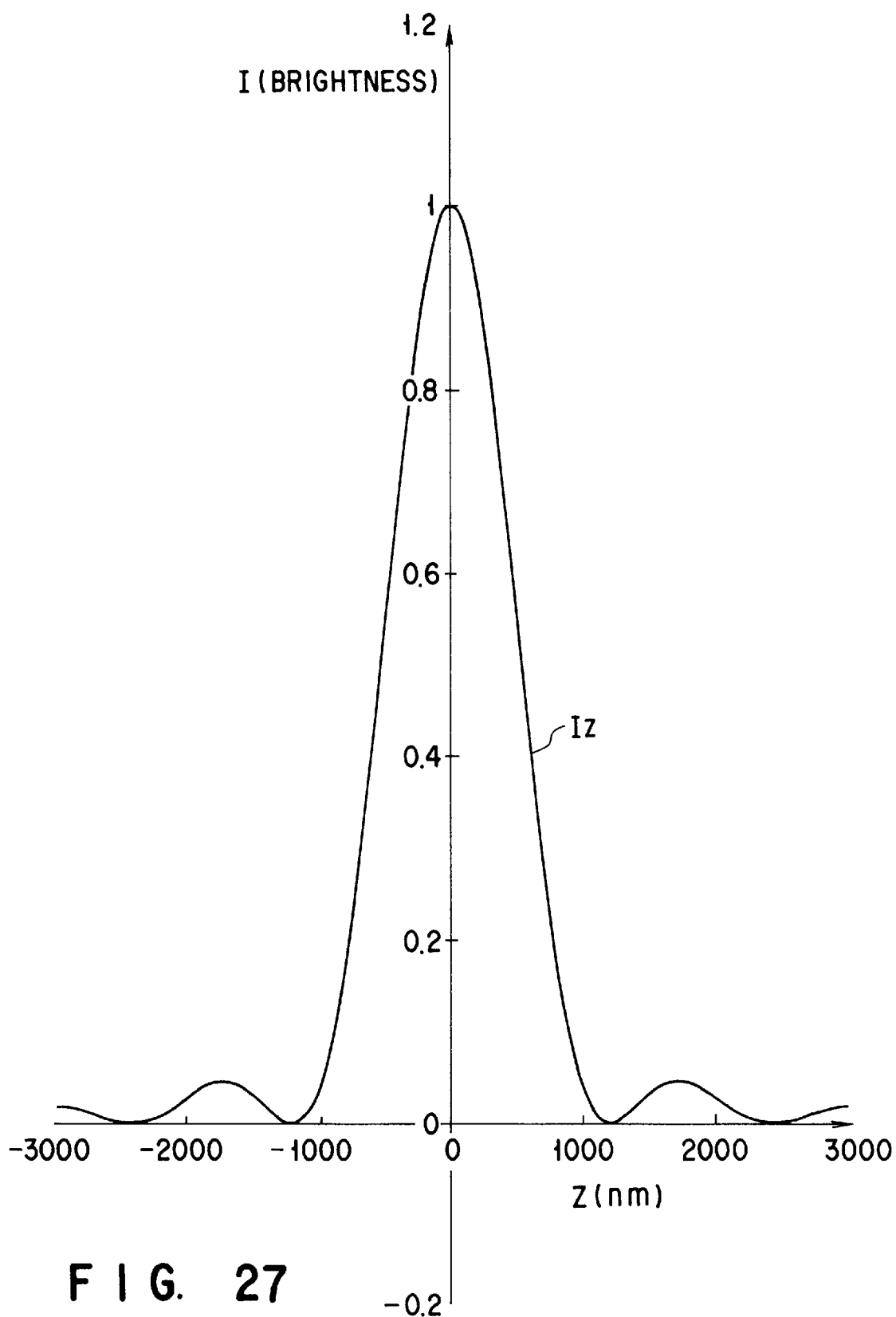
F I G. 27

MICROSCOPE HAVING A CONFOCAL POINT AND A NON-CONFOCAL POINT, AND A CONFOCAL POINT DETECT METHOD APPLIED THERETO

BACKGROUND OF THE INVENTION

1. Field of the Invention

The present invention relates to a microscope having a confocal point and a non-confocal point, and a confocal point detect method applied thereto.

2. Description of the Related Art

Conventionally, a laser microscope has been known of scanning type which scans a sample with a laser beam and forms an image of the sample in accordance with the scanning. In this kind of scanning type laser microscope, transmitted or reflected light from a sample being scanned is converted into a photoelectric signal by means of a photoelectric converter such as a photomultiplier tube or a photodiode, and this photoelectrically converted signal is quantized by an A/D convert circuit. Thereafter, the converted signal is stored in a memory. Also, as a scanning type laser microscope of this kind, there has been a microscope with a focusing point adjust function for automatically adjusting a focusing point of an image. For example, as disclosed in Japanese Patent KOKOKU Publication No. 4-61334, a linear image sensor for forming a confocal image is used, and a focusing point detector is provided which receives a part of a light flex injected into the linear image sensor, to detect focusing point information. In accordance with an output signal from the focusing point detector, the distance between an objective lens and a sample is controlled with respect to a focusing point.

However, in such conventional microscopes, a part of a light flux injected into a linear image sensor for forming a confocal point image is injected into a focusing point detector, and therefore, the light amount of the light injected into the linear image sensor for forming a confocal point image is reduced, so that a sample image sometimes cannot be observed for a sample under slightly weak light conditions. In addition, in order to carry out a focusing point adjustment with high accuracy, the optical focusing point position must be optically adjusted between the linear image sensor for forming a confocal point image and the focusing point detector. If the position is not sufficiently adjusted, and therefore, complicated adjustment operations may be required, so that time and labor are wasted. Further, although focusing can be carried out by means of a confocal point image obtained by laser scanning, the focal depth of a confocal point image is so small. Therefore, a confocal point image is difficult to use, and there is a risk that the focusing point position cannot be determined, so that an objective lens may collide into a sample.

On the other hand, it is known that this kind of confocal scanning type optical microscope exhibits a sectioning effect in a confocal mode, and exhibits the same imaging characteristic as a conventional microscope in a non-confocal mods, as described in T. Wilson, "Theory and Practice of Scanning Optical Microscopy", ACADEMIC PRESS 1984, for example.

A conventional confocal point scanning type optical microscope is shown in Japanese Patent Application KOKAI Publication No. 61-219919. FIG. 1 is a view of an optical system, showing a first example of a conventional confocal point scanning type optical microscope. A light beam 50 from a laser light source (not shown) considered as a point light source is injected into a first optical deflector 52, passing through a beam splitter 51.

This optical deflector 52 is provided at a position common to a pupil 54 of an objective lens 53.

When the optical deflector 52 does not perform deflection, the light beam 50 goes along a light axis 55. When the optical deflector 52 performs deflection, e.g., the light beam 50 is subjected to scanning, the direction of the light beam 50 corresponds to an off-axis main light beam 56 and the center of the light beam 50 corresponds to the off-axis main light beam 56, since the optical deflector 52 is provided at the position of the pupil.

Next, the light beam 50 passes through pupil projection lenses 57 and 58, and is injected into a second optical deflector 59 provided at the position of the pupil. If this optical deflector 59 performs scanning in the Y-direction among directions of two dimensional scanning, the optical deflector 52 performs scanning in the X-direction.

The light beam subjected to two-dimensional scanning by the optical deflectors 52 and 59 is injected into the pupil 54 of the objective lens 53 by the pupil projection lens 60 and an imaging lens 61. Further, the light beam creates point light limited by diffraction, on a sample 62 by the objective lens 53. By performing two-dimensional scanning in the X- and Y-directions by means of the optical deflectors 52 and 59, the sample 62 is subjected to two dimensional scanning by the point light.

The light beam reflected from the sample 62 passes through the objective lens 53 and the pupil 54, and further passes through the imaging lens 61, thereby forming an image. The imaging surface of this image is a surface where the image is observed by a conventional optical microscope. The light beam further is returned to an optical deflector 59 by the pupil projection lens 60.

Thus, a reflected beam passes through the same path through which the beam has been injected into the sample 62, in the reverse direction, and thus returns to the beam splitter 51, This beam is picked up by the beam splitter 51 and forms a detection beam 67. Since the reflected beam returns after having passed through the optical deflectors 59 and 52, the detection beam 67 is not shifted even if the off-axis light beam is subjected to scanning. The detection beam 67 is diaphragmed onto a point by a converging lens 66. If a pin hole 69 is provided at the position where the detection beam is diaphragmed and is detected by a detector 70 behind the position, it is possible to obtain an image with a higher resolution than a conventional microscope, which does not include flares. In this case, it the pin hole 69 is withdrawn at this position, it is possible to obtain a non-confocal point image.

Since the confocal point scanning type optical is microscope as described above has a sectioning effect, it is difficult to perform focusing. For this reason, a non-confocal point light path, an eye observation light path illuminated by a white light source, or a TV observation light path conventionally applied.

FIGS. 2 and 3 are views of the optical systems respective second and third examples of different conventional confocal point scanning type optical microscopes.

In FIG. 2, a mirror 71 is provided on a light path such that the mirror is movable in the forward and backward directions on a light path. The detection beam 67 reflected by inserting the mirror 71 into the light path is diaphragmed by a converging lens 72, and is detected by the detector 73, so that a non-confocal point image is obtained. In addition, the detection beam 67 is diaphragmed onto a point by the converging lens 68, by removing the mirror 71 from the light path, and is then detected by a detector through a pin hole 69, so that a confocal point image can be obtained. By thus moving forwards or backwards the mirror 71, a confocal point image and a non-confocal point image can be selected.

In FIG. 3, a mirror 74 Is provided on a light path between an imaging lens 61 and an objective lens 53, such that the mirror 74 is movable in the forward and backward directions. By inserting this mirror 74 into the light path, illumination light from a white light source 75 passes through an half-mirror 76 and an imaging lens 77, and is irradiated onto a sample 62, reflected by mirror 74. The observation light relating to the sample 62 is introduced to a TV camera 78, so that a conventional drop illumination image can be obtained. In addition, a confocal point image can be obtained in the same manner as in the second example, by removing the mirror 74 from the light path. According to the structure of FIGS. 2 and 3, a confocal point scanning type optical microscope can be provided which performs focusing by means of a non-focal point or a drop illumination image, to achieve focusing in the same manner as in conventional microscopic observation.

According to the conventional structures described above, a confocal point scanning type optical microscope is provided which simultaneously detects focusing points by means of both a confocal point image and a non-confocal point image.

However, in the confocal point scanning type optical microscope shown in FIGS. 2 and 3, the mirrors 71 and 74 must be mechanically moved forwards and backwards to switch light paths, and the switching operation requires a significant amount of time, so that the operation feels troublesome for observers.

In addition, the mirrors 71 and 74 must be provided with a mechanism for moving themselves forwards and backwards, and therefore, the price of the apparatus becomes high and the size thereof must be enlarged, particularly in the case where the switching operation is electrically performed.

The present invention has an object of providing a focal point detect method by which focusing point adjustment can be carried out with high accuracy and rapidity.

The present invention has another object of providing a microscope which is capable of simultaneously detecting a confocal point image and a non-confocal point image, and which is capable of performing immediate selection between a confocal point image and a non-confocal point image.

SUMMARY OF THE INVENTION

The former object of the present invention is achieved by a method of detecting a focusing point for a microscope including an optical system having a non-confocal detector mode for detecting a non-confocal point and a confocal detector for detecting a confocal point, is formed at the position optically common to the focusing point of the objective lens, comprising: a stop of detecting a range of the focusing point in accordance with the non-confocal point detected by the non-confocal point detector; and a step of detecting the focusing point in accordance with the confocal point detected by the confocal point detector in the detected range of the focusing point.

Also, the former object of the present invention is achieved by a microscope comprising: a light source; an objective lens for converging light emitted from the light source onto a sample; first optical detection means for detecting light from the sample via a confocal point diaphragm; second optical detection means for detecting light from the sample which does not pass through the confocal point diagram; and focusing point detection means for detecting a range of a focusing point in accordance with the light detected by the second optical detection means, and for detecting the focusing point in accordance with the light detected by the first optical detection means in detected range of the focusing point.

According to the above invention, the range of a focusing point is obtained with respect to a relatively wide range by detecting a non-confocal point of a sample image, and further, the focusing position is obtained within a narrow range by detecting a confocal point, with respect to the range of the confocal point detected by the non-confocal point detection. Therefore, the position of a focusing point of a desired portion can be detected accurately and rapidly.

Further, the latter object of the present invention is achieved by a microscope comprising a light source; an objective lens for converging light emitted from the light source onto a sample; an optical deflection member, provided between the light source and the objective lens, for scanning the sample in directions perpendicular to each other by changing an incident angle of light entering into the objective lens; first optical deflection means for detecting light from the sample in a confocal point diaphragm; second optical detection means for detecting light from the sample; and image detect means for detecting a confocal point image signal of the sample in accordance with the light detected by the first optical detection means, based on the light made pass through the confocal point and for detecting a non-confocal point image signal of the sample based on the light detected by the second optical detection means.

From the above, it is possible to easily and immediately select and obtain a confocal point image and a non-confocal point image, without requiring a component which is mechanically movable.

Furthermore, the latter object of the present invention is also achieved by a microscope comprising: a light source; an objective lens for converging light emitted from the light source onto a sample; an optical deflection member, provided between the light source and the objective lens, for scanning the sample in directions perpendicular to each other by changing incident angle of light entering into the objective lens; first optical detection means for detecting light from the sample via a confocal point diaphragm; second optical detection means for detecting light from the sample which does not pass through the confocal point diaphragm; and image detection means for detecting a confocal point image signal of the sample in accordance with the light detected by the first optical detection means, for detecting an image signal based on light reflected by the confocal point diaphragm, and for detecting a non-confocal point image signal by adding the image signal and the confocal point image signal.

From the above, it is possible to obtain a confocal point image and a non-confocal point image without complicating the structure of the apparatus and without wasting the light amount of the light reflected from the sample.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a view schematically showing a second embodiment of the present invention.

FIG. 10 is a view schematically showing a pin hole plate used in the third embodiment.

FIG. 11 is a view explaining the third embodiment.

FIG. 12 is a view schematically showing a fourth embodiment of the present invention.

FIGS. 13A and 13B are views schematically showing a non-confocal point optical detector used in the fourth embodiment.

FIG. 19 is a view showing an optical system and explaining a tenth embodiment of the present invention.

PIG. 20 is a view showing an optical system and explaining an eleventh embodiment of the present invention.

Figure 21:
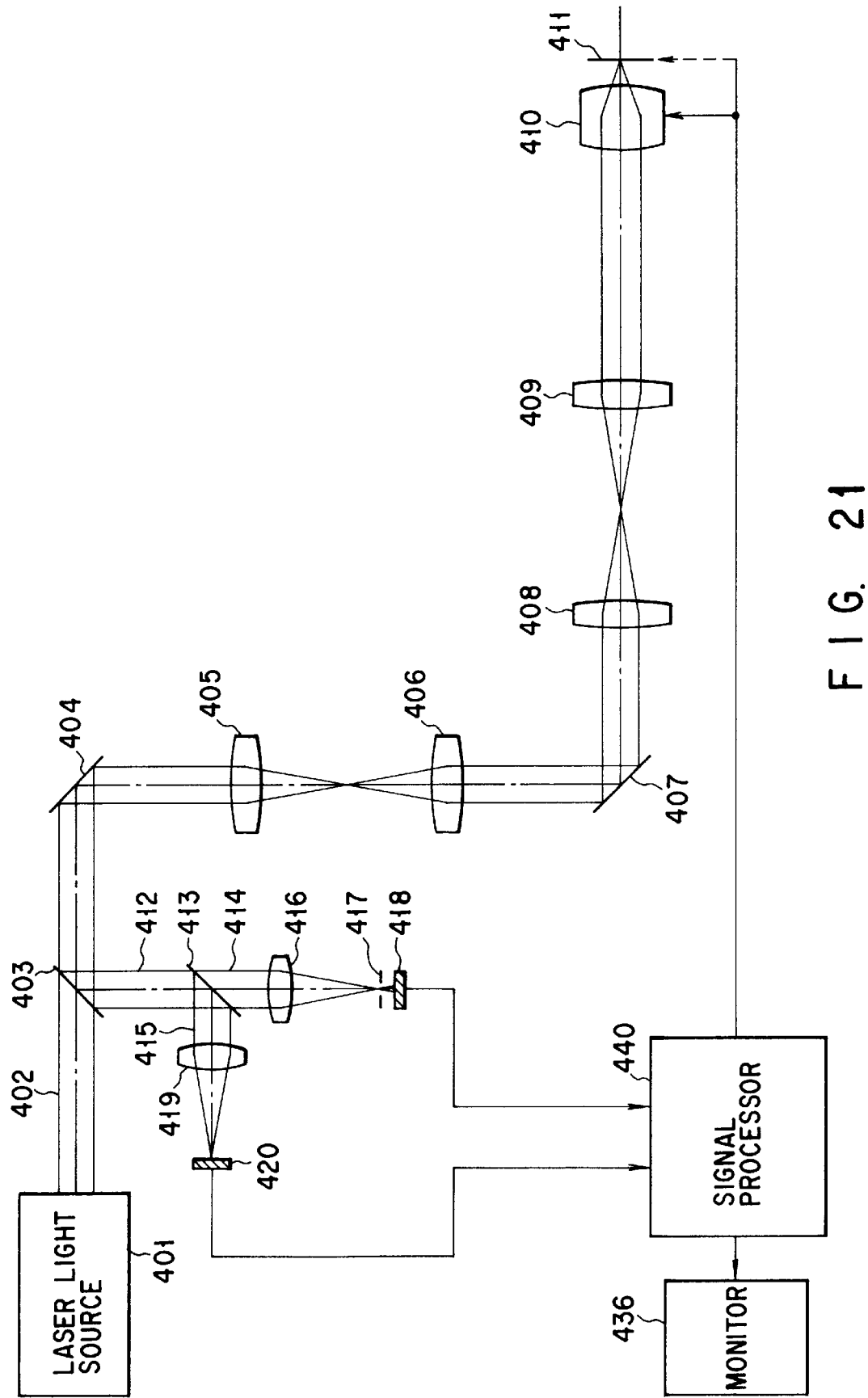

FIG. 21 is a view showing an optical system and explaining a twelfth embodiment of the present invention.

FIG. 22 is a view showing an optical system and explaining a thirteenth embodiment of the present invention.

Figure 23:
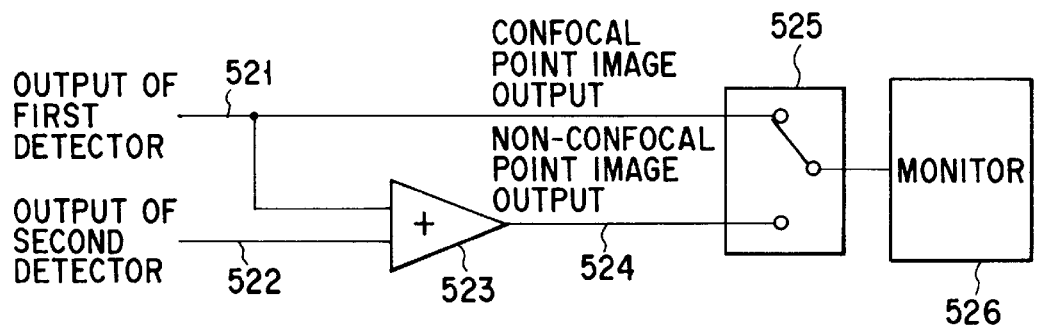

FIG. 23 is a view showing a structure of an optical system in the same embodiment.

Figures 24A, 24B, 24C:
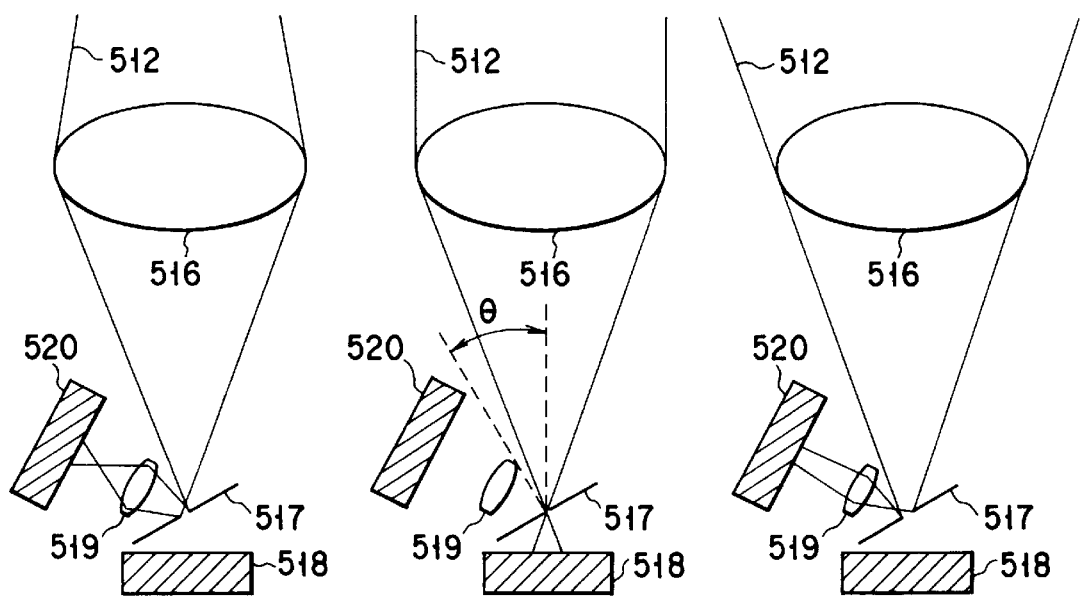

FIGS. 24A, 24B, and 24C are views showing the operation of a diaphragm by a pin hole mirror in the same embodiment.

FIG. 25 is a view showing a relationship between a movement amount of the objective lens in the direction toward the sample and an image output of the first detector in the same embodiment.

Figure 26:
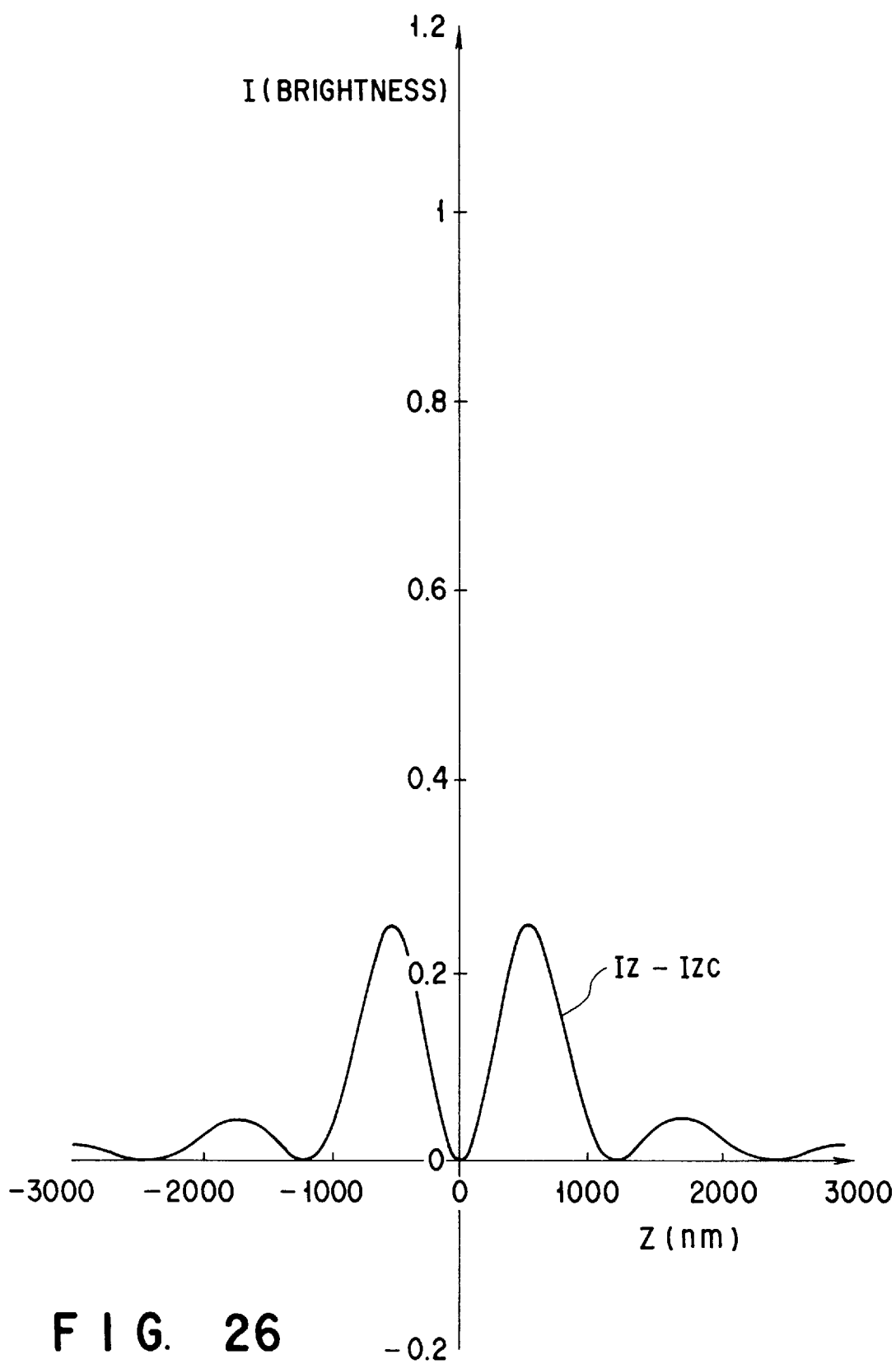

FIG. 26 is a view showing a relationship between a movement amount of the objective lens in the direction toward the sample and an image output of the second detector in the same embodiment.

FIG. 27 is a view showing a relationship between a movement amount of the objective lens in the direction toward the sample and an image output of the adder in the same embodiment.

Figure 28A:
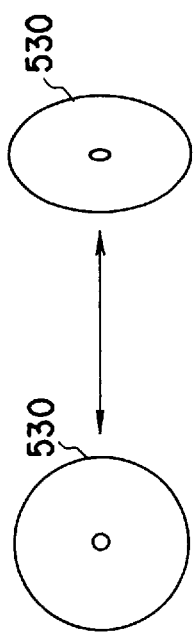

FIGS. 28A and 28D are views showing shapes of pin holes formed in the pin hole mirror in the same embodiment.

Figure 29:
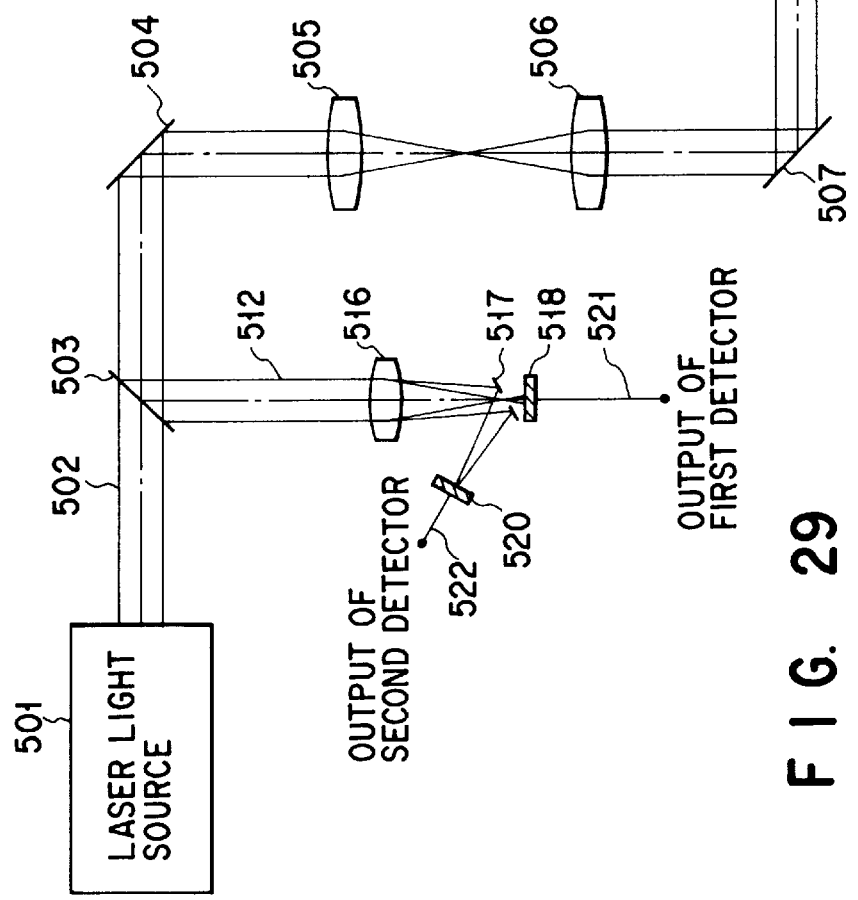

FIG. 29 is a view showing a structure of an optical system in the fourteenth embodiment of the present invention.

Figure 30:
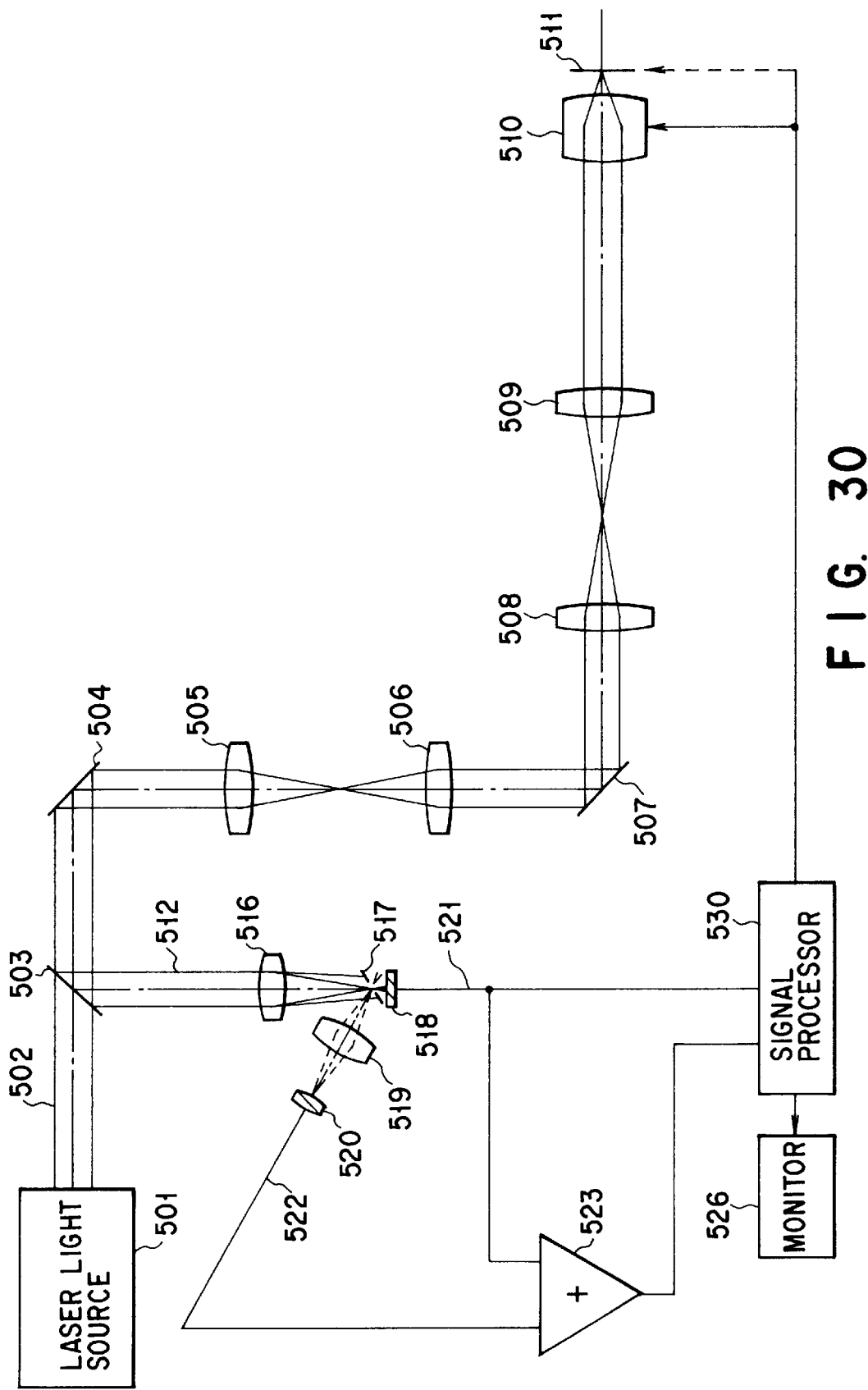

FIG. 30 is a view showing a structure of an optical system in the fifteenth embodiment of the present invention.

DETAILED DESCRIPTION OF THE PREFERRED EMBODIMENTS

In the following, preferred embodiments of the present invention will be explained with reference to the drawings.

First Embodiment

Figure 1:
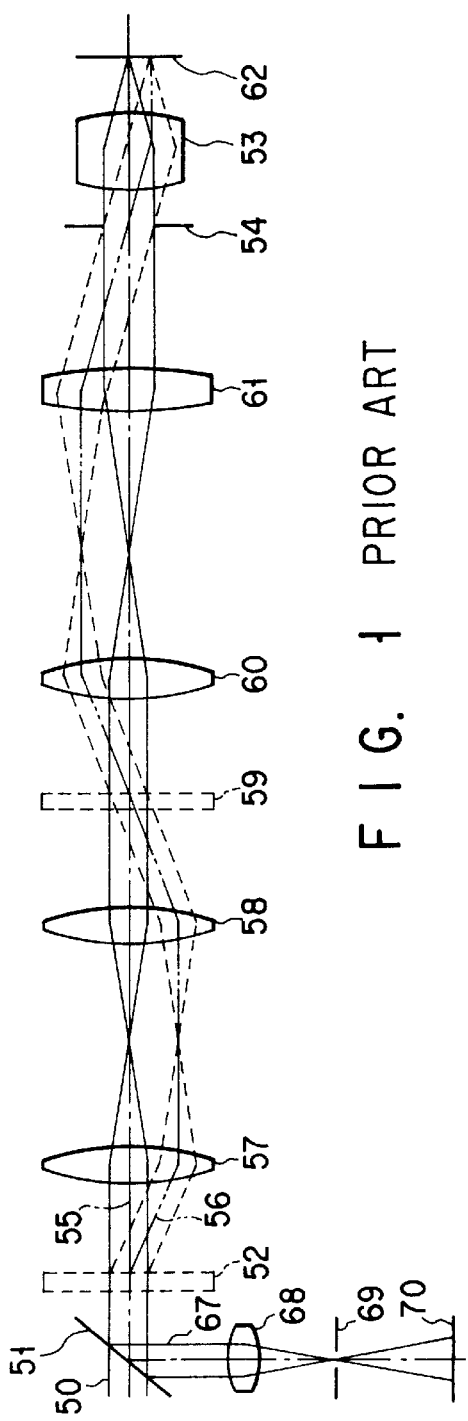
FIG. 1 is a view showing an optical system of an example of a conventional confocal point scanning type optical microscope.
Figure 2:
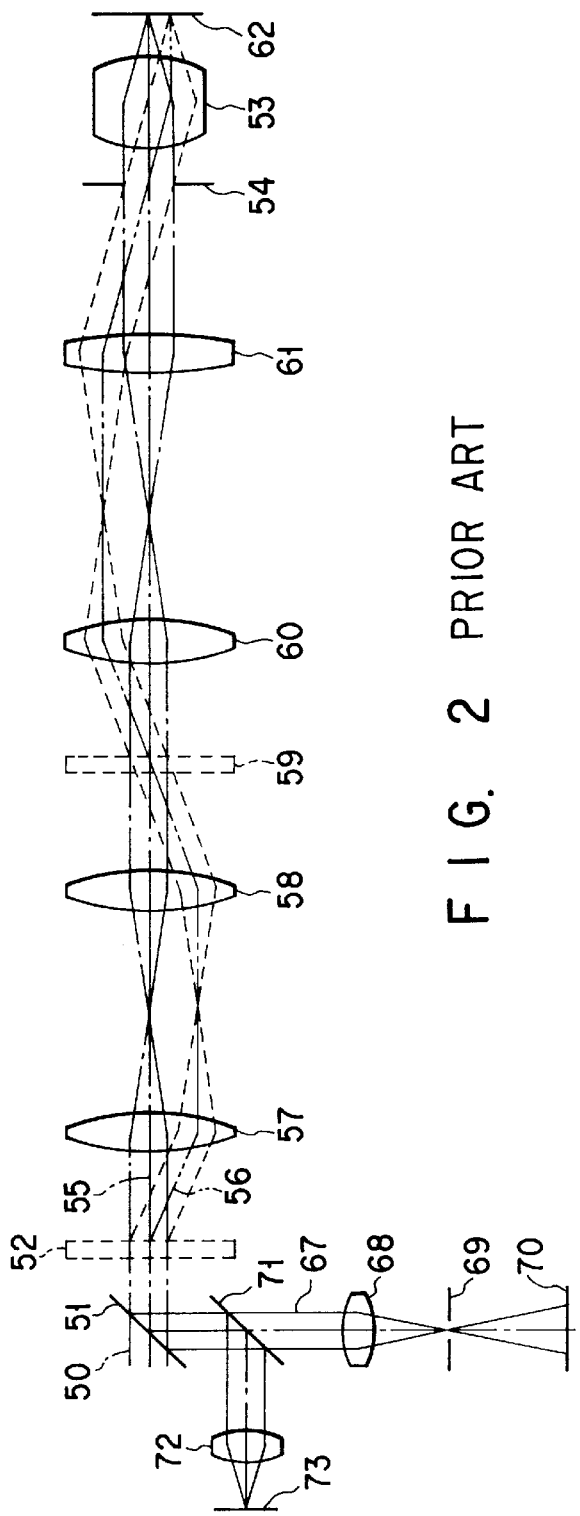
FIG. 2 is a view showing an optical system of another example of a conventional confocal point scanning type optical microscope.
Figure 3:
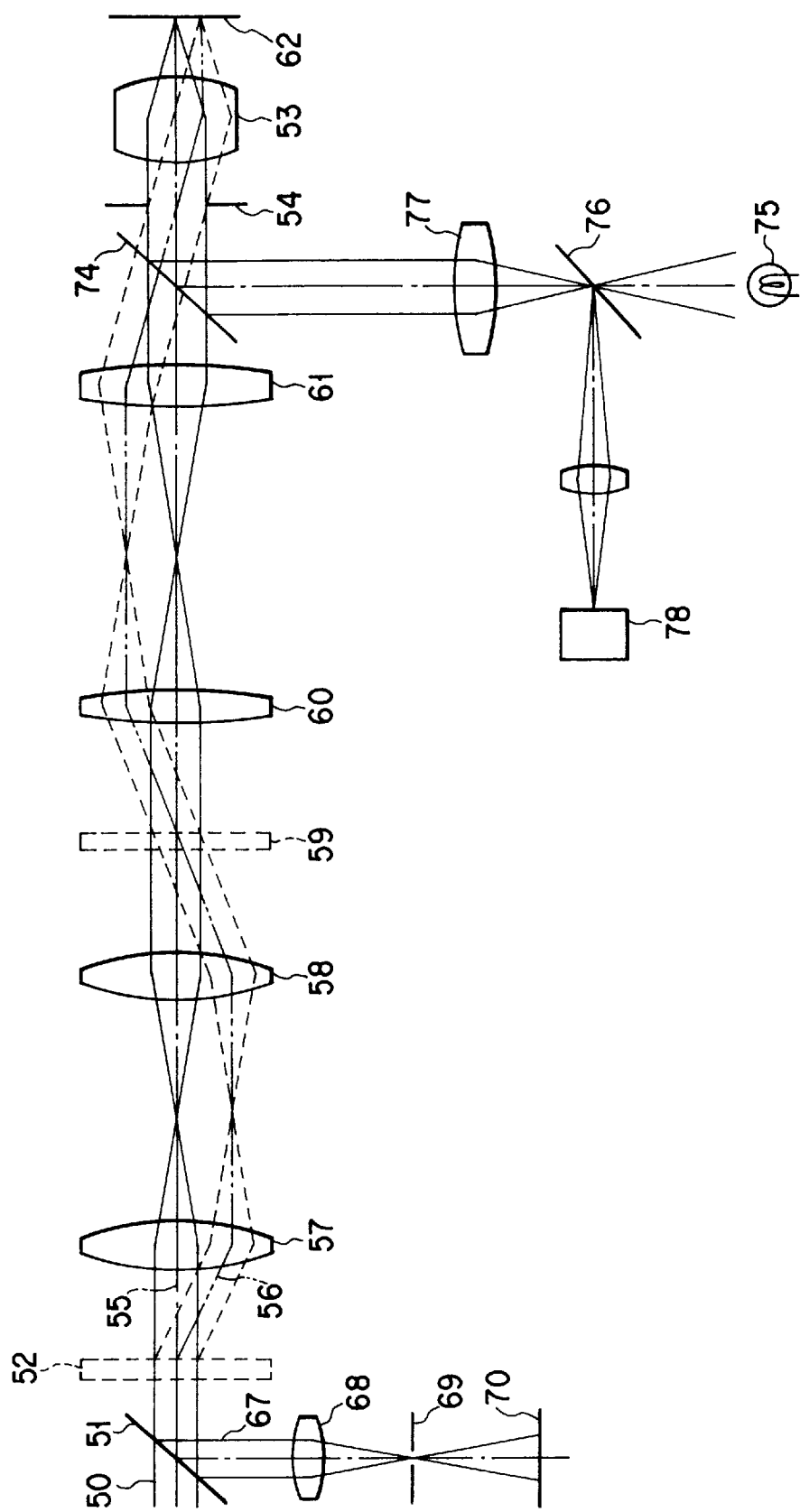
FIG. 3 is a view showing an optical system of another example of a conventional confocal point scanning type optical microscope.
Figure 4:
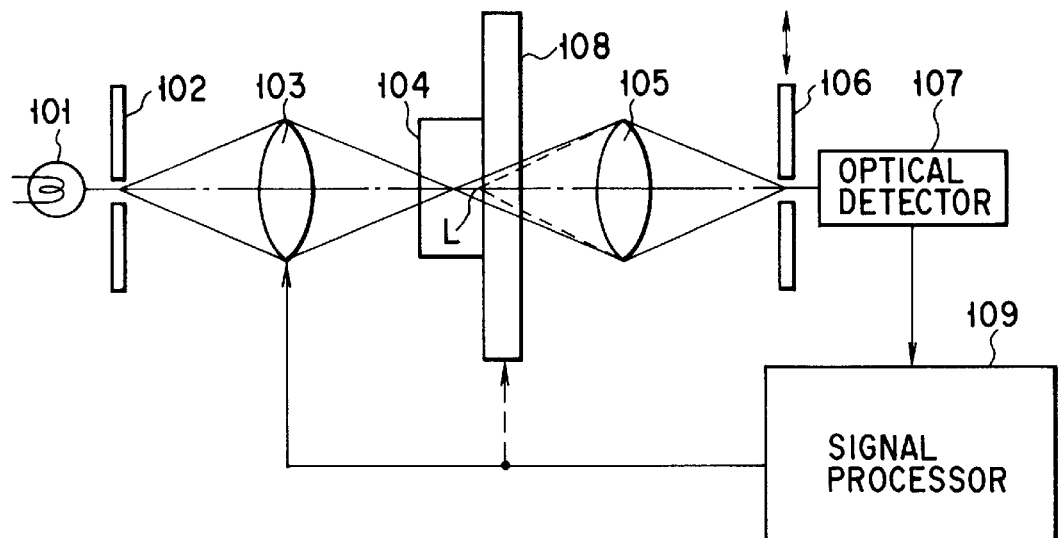
FIG. 4 is a view schematically showing a first embodiment of the present invention.

As shown in FIG. 4, the first embodiment of the present invention is arranged such that a light source 101 and a pin hole 102 constituted a point light source, and such that light from the point light source is imaged as point light on an observation sample 104, through a condenser lens 103 whose aberration is sufficiently compensated, thereby illuminating the sample 104. Further, the point light which has passed through the sample which is placed on a stage 108, is supplied to an optical detector 107 through an objective lens 105 whose aberration is also sufficiently compensated.

A pin hole 106 is arranged at an imaging position in front of a light receive surface of the optical detector 107, in a manner such the pin hole 106 can be freely detached therefrom. By imaging point light from the objective lens 105 on the pin hole 106 with the pin hole 106 attached, the point light thus imaged is detected through the pin hole 106 by the optical detector 107, which thus functions as a confocal point sensor for detecting a confocal point image. In addition, by directly detecting point light from the objective lens 105 by the optical detector 7 with the pin hole 106 detached, the detector functions as a non-focal point sensor for detecting a non-focal point image. Note that a two-dimensional image is obtained by subjecting the sample 104 to two-dimensional scanning.

Figure 5:
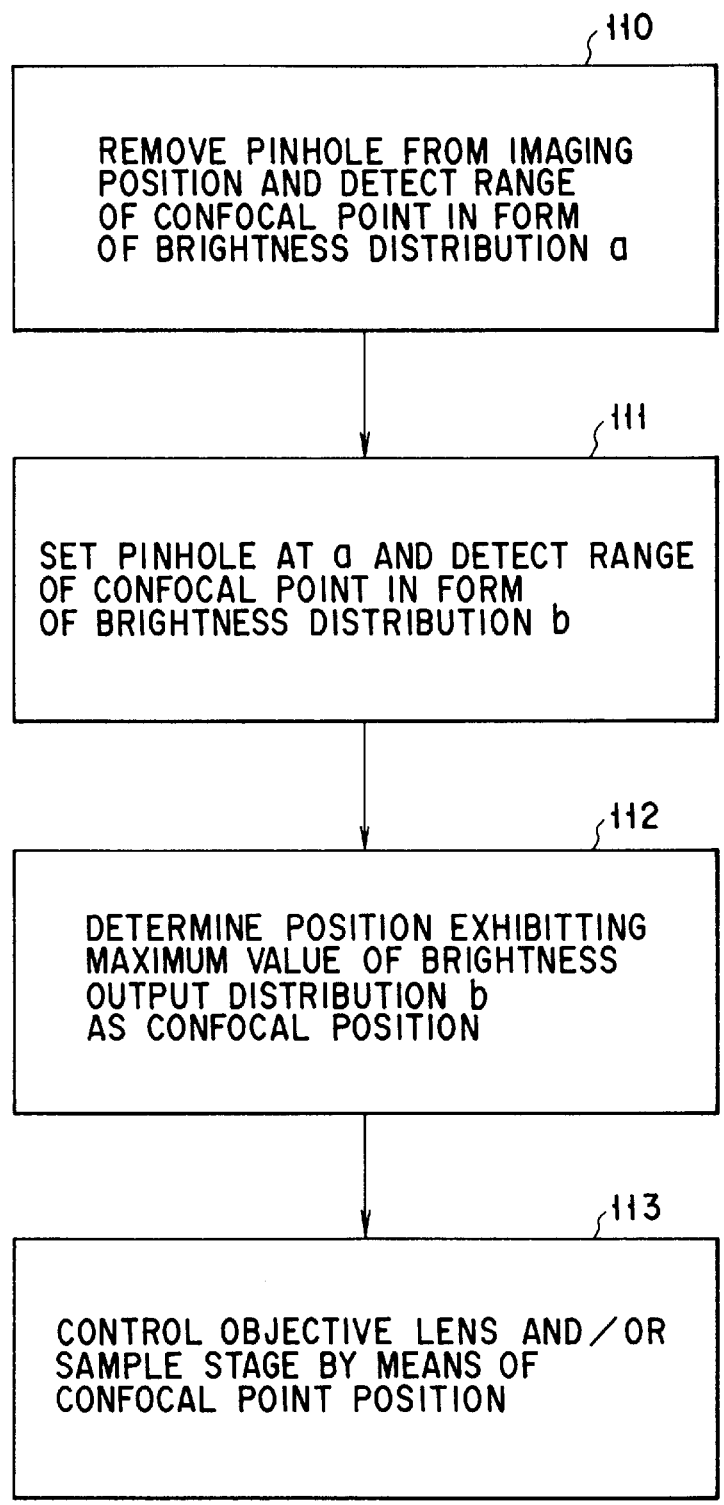
FIG. 5 is a flowchart showing a focusing point detect method according to the present invention.

Next, the pin hole is detached from the imaging position, and a non-confocal point image is detected by means of a brightness output of the optical detector 107 while moving the condenser lens 103 in the optical axis direction so that point light on the sample 104 is directly converged on the optical detector 107 by the objective lens 105. The non-focal point is supplied to a signal processor 19. (Step 110 in FIG. 5.)

Figure 6:
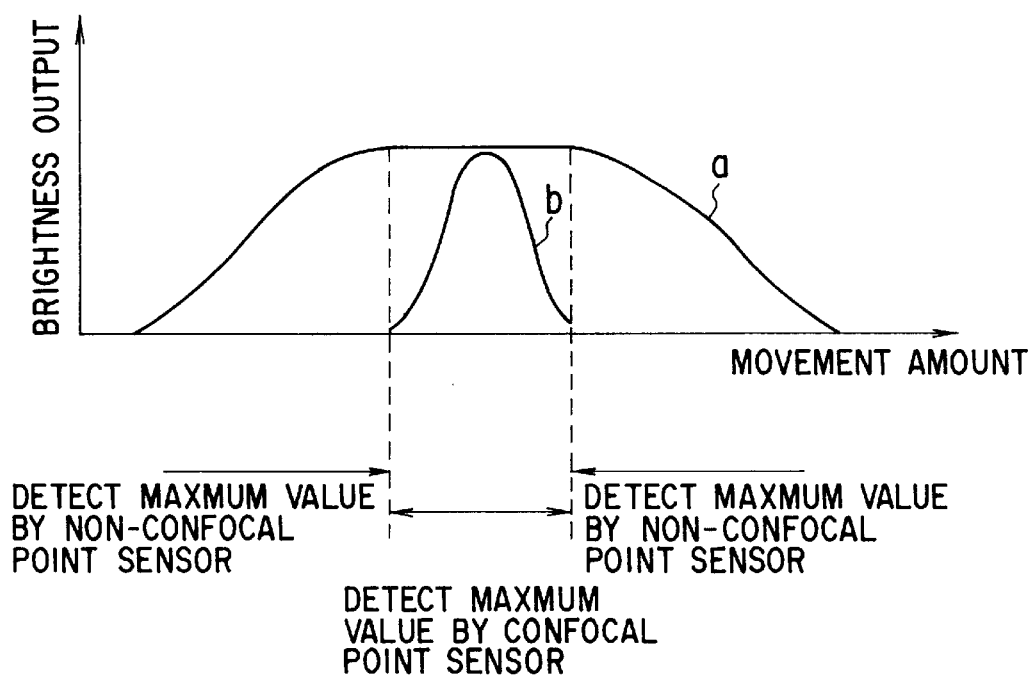
FIG. 6 is a view explaining the first embodiment.

In this case, the movement amount of the condenser lens 103 in the optical axis direction and the brightness output have a characteristic denoted by the reference a in FIG. 6. When the brightness output distribution maintains a constant level at its uppermost value, it is determined that a focusing point is obtained. However, the focusing point is obtained within a relatively wide range.

At the time point when such a focusing point is obtained, the pin hole 106 is inserted at the imaging position. In this case, point light imaged on the pin hole 106 along the light path indicated by continuous lines in FIG. 4 is detected by the optical detector 107 through the pin hole 106. However, a confocal point is detected by a brightness output from the optical detector 107 and is supplied to the signal processor 109, while light along the light path indicated by broken lines in FIG. 4 from a position L shifted from the converging position of the objective lens 103 is arranged so as not to pass through the pin hole 106 or reach the optical detector 107. (Step 111 in FIG. 5.)

In this case, the movement amount of the objective lens 103 in the direction toward the sample 104 and the brightness output have a characteristic indicated by a reference b in FIG. 6. When the brightness output distribution at the signal processor 109 is the uppermost value, it is determined that a focusing position is obtained. (Step 112 in FIG. 5.) The focusing position is thus obtained within a very narrow range.

As has been described above, the pin hole 106 is removed from the imaging position, at first, and a coarse focusing position is obtained by detecting a non-confocal point by means of the optical detector 107. Then, the pin hole 106 is provided on the light receive surface of the optical detector, and further, a confocal point is detected within the range of the coarse focusing position, so that a confocal position of a narrow range is obtained. It is therefore possible to detect a focusing position of a desired portion more rapidly and accurately in comparison with a conventional method of obtaining a focusing position only by means of confocal point detection.

Since, in the conventional method, a sample image is taken in a way to be split at an image formation sensor and just-in-focus sensor, the focusing sensor receives less amount of light and it has been difficult to find an accurate focal position relative to the sample under slightly weak light conditions. According to the present invention, so that on the other hand, use is made of an image formation focusing-combined sensor, it is possible to find an accurate focal position relative to a sample under very weak light conditions, without a decrease in an amount of light. Further, a focusing point detected by the signal processor 109 is supplied to a movement mechanism not shown for the objective lens 103 and/or to a movement mechanism not shown for the stage 108, to move and control the objective lens 103 and/or the stage 108. (Step 113 in FIG. 5.)

Second Embodiment

FIG. 7 shows a scanning type confocal point microscope as the second embodiment of the present invention. In FIG. 7, the microscope body 221 comprises a laser light source 222, a mirror 223, an half-mirror 224, a two-dimensional scanning mechanism 225, a revolver 226, an objective lens 227, a stage 228, a sample 229, a lens 230, a pin hole plate 231, a confocal optical detector 232, an half-mirror 238, a lens 239, a non-confocal point optical detector 240, and the like. In addition, the microscope body 221 is connected with an image processing unit 233 including image memories 233A and 233B and an image determine circuit 233C, an X- and Y-scanning drive control circuit 234, a Z-scanning drive control circuit 235, a computer 236, a monitor 237, and a confocal/non-confocal point switch SW241.

In this embodiment, the laser light source 222 generates a laser beam as a spot beam for scanning the surface of the sample 229. The laser beam from the laser light source 222 is reflected by a mirror 223, and is then introduced to the two-dimensional scanning mechanism 225. The two-dimensional scanning mechanism 225 scans the sample 229 with a laser beam from the laser light source 222 supplied through the mirror 223. The two-dimensional scanning mechanism 225 includes a galvanic mirror for scanning in the X-axis direction and a galvanic mirror for scanning in the Y-axis direction. In order to perform scanning in the X- and Y-directions with spot light under control of the X- and Y-scanning drive control circuit 234, the light path of the spot light to the objective lens 227 is shifted in X- and Y-axis directions, by shifting the galvanic mirrors in the X- and Y-axis directions. The revolver 226 holds a plurality of objective lenses 227 of different magnifications, and such one of the plurality of objective lenses 227 which has a desired magnification is selected and inserted in the observation light path of the microscope. Further, the spot light subjected to two-dimensional scanning by the two-dimensional scanning mechanism 225 through the objective lens 227 thus selected and inserted is irradiated onto the sample 229 on the stage 228.

Meanwhile, observation data light such as reflected light, and fluorescent light is returned to the two-dimensional scanning mechanism 225 through the objective lens 227, and is then returned to the half-mirrors 224 and 238 through the two-dimensional mechanism 225. These half-mirrors 224 and 238 are translucent mirrors provided on the injection light path of the laser light source 222 with respect to the two-dimensional mechanism 225, and are used to introduce light reflected from the sample 229 supplied through the two-dimensional scanning mechanism 225, to an optical detector system.

For example, reflected light obtained from the two-dimensional scanning mechanism 225 by the half-mirror 224 is converged by a lens 230, and is supplied to the pin hole plate 231. The pin hole plate 231 has a pin hole of a predetermined diameter, and is arranged such that the pin hole is positioned at the imaging position in front of the light receive surface of the confocal point optical detector 232. In addition, the confocal point optical detector 232 consists of an optical detector element for converting light obtained by the pin hole of the pin hole plate 231, into an electric signal corresponding to the light amount of the light.

Meanwhile, reflected light obtained from the two-dimensional scanning mechanism through the half mirror 238 is converged by the lens 239, and is supplied to the light receive surface of the non-confocal point optical detector 240. This non-focal point optical detector 240 consists of an optical detector element such as a photomultiplier or a photodiode, for converting light obtained without passing through the pin hole, into an electric signal corresponding to the light amount of the light.

The Z-scanning drive control circuit 235 is controlled by the computer 236 or the image determine circuit 233C, and is used to move and control the revolver 226 maintaining a plurality of objective lenses 227 having different magnifications, in units of reference widths in the height direction of the revolver, i.e., in the Z-axis direction. In addition, the Z-scanning drive control circuit 235 has a function of updating a count value by +1 every time when the revolver 226 is moved and controlled in the Z-axis direction in units of reference widths, and also has a function of supplying the count value to the image processing unit 233.

The image memories 233A and 233B of the image processing unit 233 are image memories each having a capacity equivalent to one frame, wherein one frame consists of 512 pixels×512 pixels×8 bits (256 gradations). The image processing unit 233 includes an image determine circuit 233C in addition to the two image memories 233A and 233B each having a capacity equivalent to one frame.

Further, an output signal from the confocal point optical detector 232 or the non-confocal point optical detector 240 is received through the switch SW241, the image memory 233A stores an electric signal (brightness signal) of reflected light, among the image memories 233A and 233B. In this case, the signal is stored as 8-bit data at a pixel position of the spot light corresponding to the current X- and Y-scanning position. This storage enables an addition of images having different heights, in such a manner in which the brightness signal is stored as the storage data of a pixel position when the level of the brightness signal is higher than the level of a preceding brightness signal of the same pixel position. In addition, the image memory 233B is supplied with data concerning the Z-axis scanning direction at a pixel position corresponding to the current X- and Y-scanning position of the spot light, i.e., the Z-scanning drive control circuit 23S supplies the image memory 233B with a value of the number of times for which the revolver 226 has been moved, and the value of the number of times is updated and stored as data when the level of a current brightness signal of the same pixel position is higher than the level of a preceding brightness signal of the same pixel position, from data stored in the image memory 233A. Thus, in the image memory 233B, a value of the number of times for which the revolver has been moved when data represents the maximum brightness is stored as data concerning the Z-scanning direction, for each of pixel positions.

Note that current X- and Y-layer position data of the spot light is supplied to an image processing unit 233 by an X- and Y-scanning drive control circuit 234. The image determine circuit 233C performs automatic range setting when an image is automatically formed, transmission of the setting values to the computer 236, and control of Z-scanning drive control circuit 235. The image processing unit 233 also performs processing of reading data stored in the image memories 233A and 233B and of supplying the data to the computer 236.

In addition to control of the X- and Y-scanning drive control circuit 234, the Z-scanning drive control circuit 235, and the image processing unit 233, the computer 233 performs storing, reproducing and editing of image data, and serves to perform main part of processing. A monitor 237 is an image display terminal of the computer 236, and is used to display necessary data and images. The computer 236 controls switching operation of the switch SW241 which performs switching between the output of the confocal point optical detector 232 and the output of the non-confocal point optical detector 40.

Figure 8:
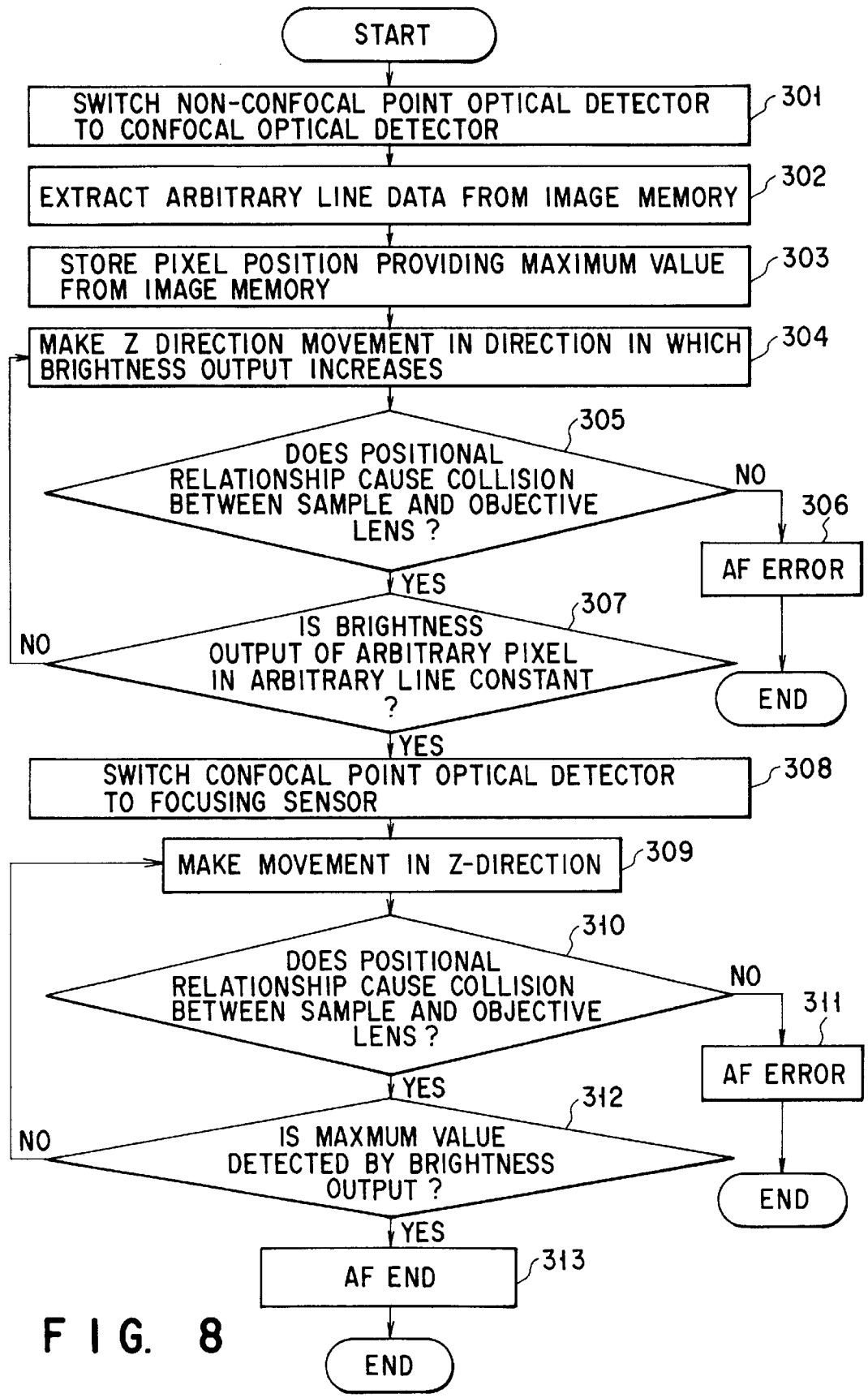
FIG. 8 is a flowchart explaining the operation of the second embodiment.

In the structure as described above, when an operator turns on a switch not shown for starting focusing and the computer 236 detects an ON-signal for starting the focusing, the processing of the flowchart shown in FIG. 8 is executed. At first, setting is carried out such that the output from the non-confocal point optical detector 240 is supplied to the image processing unit 233 by the switch SW241 and the non-confocal point optical detector 240 is used as a focusing sensor. (Step 301).

Further, as described above the laser beam from the laser light source 222 is subjected to two-dimensional scanning by the two-dimensional scanning mechanism 225. The laser beam is irradiated as spot light onto the sample 229 on the stage 228 through an objective lens 227. The light reflected from the sample 229 is made pass through the objected lens 227, and is converged onto the light receive surface of the non-confocal point optical detector 240, from the half-mirror 238 through the lens 239. In this manner, an output from the non-confocal point optical detector 240 is taken in as image data by the image processing unit 233, and the data is stored into the image memory 233A. Further, image data of an arbitrary line is taken in by the computer 236, to obtain a pixel position which maximizes the brightness output of the image of the arbitrary line. (Steps 302 and 303). In this case, an arbitrary line may be line data in the vicinity of the center of the image or arbitrary line data selected by a user. In addition, since data necessary for focusing is of one line, it is possible to stop Y-axis direction scanning, and to take-in data of only one certain line by means of the image memory 33A.

Once a pixel to be monitored is thus decided, the positional relationship between the objective lens 227 and the sample 229 is controlled in the direction in which the non-confocal point optical detector 40 increases. (Step 304) Specifically, the positional relationship between the objective lens 227 and the sample 229 is controlled such that the brightness output is maximized, with the non-confocal point optical detector 240 being used as a focusing point detector sensor.

Here, in place of obtaining a pixel output which maximizes the brightness output in one line, it is possible to control the positional relationship between the objective lens 227 and the sample 229 such that the pixel output average value of one line is maximized. Otherwise, it is possible to control (by Z-revolver control) the positional relationship between the objective lens 227 and the sample 229 such that the pixel average value of an arbitrary block of one line is maximized. To perform the Z-revolver control, the positional relationship between the sample and the objective lens 227 is calculated by the computer 236, such that the sample 229 and the objective lens 227 do not collide into each other.

This control is carried out in the following manner. The control is subjected to a condition that the focusing position is obtained only by the Z-revolver control with the stage 228 fixed to an arbitrary position. In addition, the initial position of the S-revolver is defined an the uppermost limit, and is defined as the reference position. The distance from this reference position to the position of the stage 288 is defined as 1, and the objective lens position is obtained by a sum of the Z-revolver movement amount from the origin position of the Z-revolver, the length of the Z-revolver, and the length of the objective lens. The position of the objective lens is defined as Im. Here, the Z-revolver position includes an error caused by a Z-revolver tolerance and an objective lens tolerance. In addition, the thickness of the sample 229 is defined as d, and the thickness of the sample varies depending on the target to be focused. The thickness of the target is defined by a user. Hence, the distance between the sample 229 and the objective lens 227 is obtained by Wd=1−1m−d. In this case, each of these values includes an error caused by a tolerance. A possibility of a collision between the sample 229 and the objective lens 227 occurs when the value of Wd is negative.

In the next, the switch SW241 is switched such that the output from the confocal point optical detector 232 is supplied to the image processing unit 233, thereby to use the confocal point optical detector 232 as a confocal sensor. (Step 308)

In this case, also, the positional relationship between the objective lens 227 and the sample 229 is controlled in a direction in which the output of the confocal point optical detector 232 increases. (Step 309.) Specifically, the confocal point optical detector 232 is used as a focusing point detector sensor, and the positional relationship between the objective lens 227 and the sample 229 is controlled such that the brightness output is maximized. In this control, the movement in the Z-direction is reversed so as to pursue the focusing position when it is detected that the output value has been changed in a direction in which the value is decreased, after the confocal point optical detector 232 had detected a maximum value.

In this case, also, control for obtaining a focusing position is proceeded while calculating the positional relationship between the sample 229 and the objective lens 227 and confirming that the sample 229 and the lens 227 do not collide into each other. (Step 310)

Here, if it is determined, in the step 310, that there is a risk that the sample 229 and the objective lens 227 collide into each other, an AF error is generated in a step 311, so that the AF operation is stopped and a warning is supplied to a user by the monitor 237.

Thereafter, when the maximum value of the brightness output of the confocal point optical detector 240 is obtained within a narrow range, as indicated by the reference b in FIG. 6 described above, it is determined that a focusing position has been detected, and the focusing position detection is terminated. (Steps 312 and 313.)

In this arrangement, the non-confocal point optical detector 240 is used at first as a focusing sensor, to obtain a wide range in which the brightness output is a maximum value, as a coarse focusing position, and the confocal point optical detector 232 is switched from this state into a focusing sensor, to further obtain a focusing position within a narrow range in which the brightness output is a maximum value, with respect to the wide range of the coarse focusing point. Therefore, the focusing position of a desired portion can be accurately and rapidly detected. In case of this embodiment, it is possible to demonstrate the advantages of the first embodiment. According to the present invention, on the other hand, use is made of an image formation/focusing-combined sensor, it is possible to find an accurate focal position relative to a sample under a very weak light, without a decrease in an amount of light. The focusing position thus detected is supplied to a movement mechanism not shown of the objective lens 227 and/or to a movement mechanism not shown of the stage 228, to move and control the objective lens 227 and/or the stage 228, for the purpose of focusing control.

Third Embodiment

Figure 9:
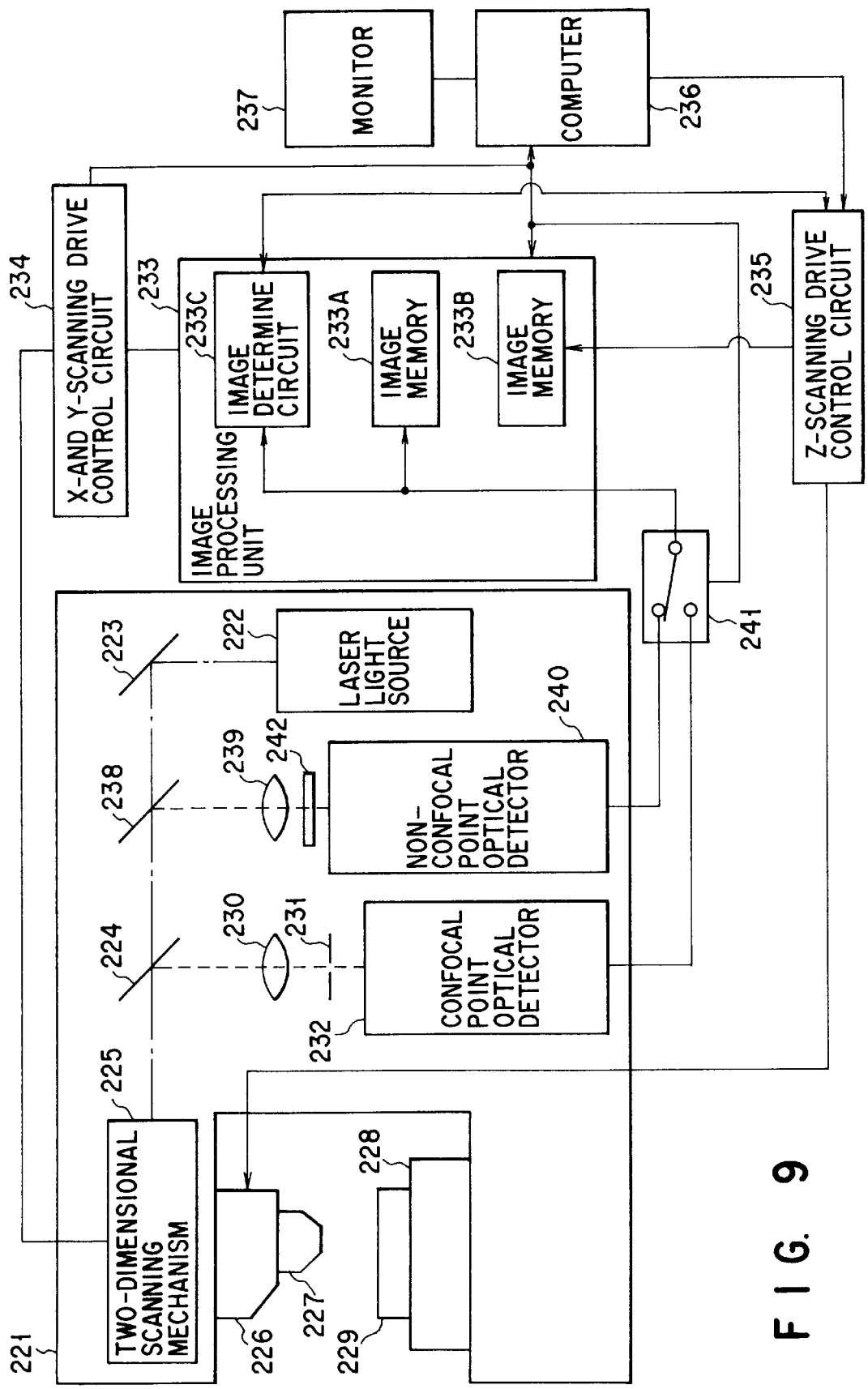
FIG. 9 is a view schematically showing a third embodiment of the present invention.

In this third embodiment, as shown in FIG. 9, a pin hole plate 242 having pin holes corresponding to magnifications of a plurality of objective lenses 227 is installed on the revolver 226, and is positioned in front of the non-confocal point optical detector 240. In this case, as shown in FIG. 10, the pin hole plate 242 includes pin holes 242a, 242b, and 242c respectively having three different diameters, and clicks 242d are provided along a side edge, so that the pin holes can be selectively inserted in the light axis in correspondence with the objective magnifications. In this case, the pin hole plate 242 is moved by means of electric switching in accordance with instructions from the computer 236.

In the next, advantages of changing the pin hole diameter will be explained. It is well-known that the smaller a magnification is, the greater the focus depth of an objective lens is. Since this applies to the intensity distribution a in the optical axis direction, in the non-confocal point optical system, the smaller the magnification of an objective lens is, the larger the distance in the optical axis is. The same relation applies to the a confocal point.

Therefore, when an objective lens of a low magnification is used, the width in the optical axis direction is enhanced, with respect to both of confocal and non-conrocal points. However, there is a possibility that the width may be as shown in FIG. 11. FIG. 11 shows a state in which there exists a range X in which the brightness of the confocal point is zero within a range in which the brightness of the non-confocal point is constant. In this relation, the output of the confocal point optical detector 232 cannot be used immediately after the brightness output of the non-confocal point optical detector 240 has become constant. Therefore, the optical output of the non-confocal point optical detector 240 must be used until the brightness output of the confocal point optical detector 232 is generated. This control, however, requires a long time, since the output is constant.

As is apparent from FIG. 6, one same objective lens even results in a large difference in its intensity distribution in the optical axis direction, depending on presence or absence of a pin hole. Inversely, this means that the intensity distribution in the optical axis direction can be changed in accordance with the magnification of a pin hole. Therefore, in case of FIG. 11, the intensity distribution of the non-confocal point in the optical axis direction can be changed as indicated by broken lines, by providing a pin hole in the non-confocal point side as in this embodiment. As a result of this, the range x of the problem can be eliminated, so that rapid focusing can be realized.

The computer 236 always recognizes data concerning an objective lens 227. When the computer 236 receives a request for changing the magnification of the objective lens 227, the computer 236 selects a pin hole having a small diameter so that the range where the brightness is constant is narrowed, if the requested magnification is low. If the requested magnification is high, a pin hole having a large diameter is selected so that the range where the brightness is constant is widened.

Thus, a pin hole plate 242 having pin holes 242a, 242b, and 242c respectively having different diameters is provided in the non-confocal point optical detector 240 side, and one of the pi holes 242a, 242b, and 242c is selected in correspondence with the magnification of the objective lens 227, Therefore, it is possible to stable detect a focusing point even when the objective lens 227 has a low magnification. In addition, it is possible to provide a means which is capable of continuously changing the diaphragm diameter, as a means of changing pin holes.

Although pin holes are provided in the non-confocal point side in the present embodiment, it is possible to provide pin holes as shown in FIG. 10, in the confocal point side. In this case, a large pin hole is set at first so that such a range X of the problem as shown in FIG. 11 might not exist, and then, the diameter of the pin hole is gradually decreased so that the focusing accuracy is increased. If pin holes suitable for both of a confocal point and a non-confocal point can be formed in one plate, as is shown in FIG. 10, it is possible to use an optical detector for both of a confocal point and a non-confocal point. Further, in case where a plurality of objective lenses having different diameters are used, it is possible to form a plurality of pin holes having different diameters in one plate, to prepare a plurality of combinations of objective lenses and pin holes, in correspondence with the objective lenses having different magnifications.

Fourth Embodiment

The fourth embodiment is arranged such that the light receive area can be changed without changing the pin hole diameter, with respect to a non-confocal point optical detector 240'. In this case, the non-confocal point optical detector 240' is of a type in which the light receive area is divided into three ring-like or circular areas A, B, and C, as shown in FIG. 13A, and signals to be extracted from the respective areas are selected in accordance with the magnifications of the objective lens 227. Specifically, in case where the objective lens 227 has a low magnification, as shown in FIG. 13B, only the light receive area A is used. If the objective lens 227 has a high magnification, the light receive areas A, B, and C are selected so that an addition signal of signals from the areas A and B or the areas A, B, and C is extracted.

In this structure, the light receive areas of the non-confocal point optical detector 240' can be changed in correspondence with magnifications of the objective lenses, so that the accuracy output is maximized and the accuracy with which the focusing position is pursued can be increased.

In case of this embodiment, it is possible to provide pin holes in the confocal point side, like in the third embodiment. By providing a plurality of areas as light receive areas, in which confocal and plural non-confocal points can be detected, one optical detector can be used for both of confocal and non-confocal points.

Fifth Embodiment

Figure 14:
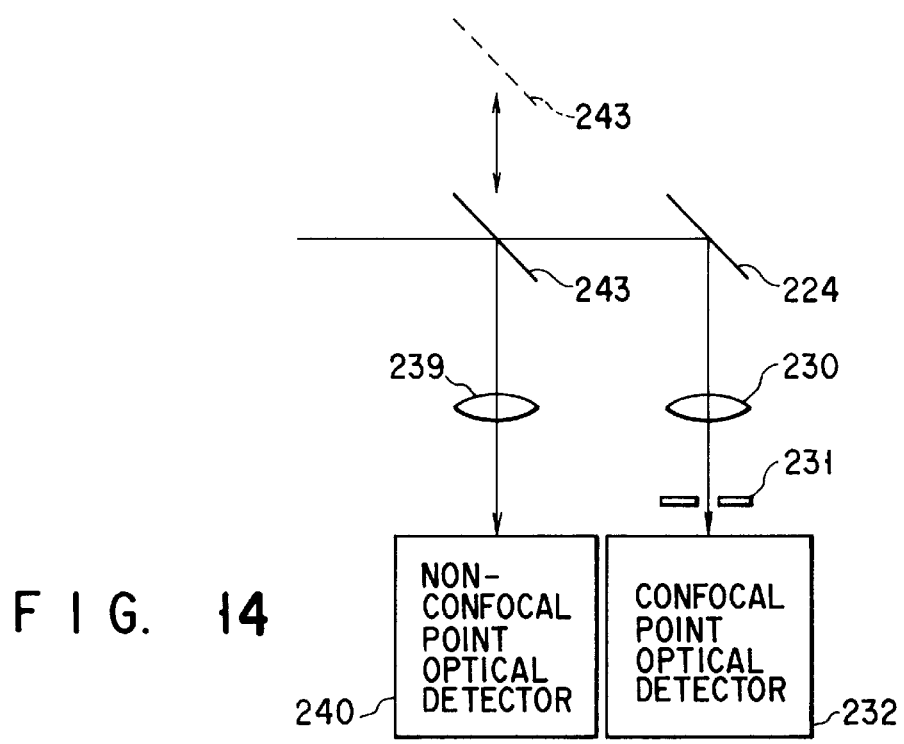
FIG. 14 is a view schematically showing a main part of a fifth embodiment of the present invention.

As shown in FIG. 14 in which the same portions as those of FIG. 7 are denoted by same reference numerals, this fifth embodiment is arranged such that the mirror 243 in the light path of the non-confocal point optical detector 240 can be driven and the mirror can be moved to a different position when the focusing sensor is switched from a non-confocal point optical detector 240 to a confocal point optical detector 232. Specifically, the mirror 243 is moved to a position where a sample image is injected into the non-confocal point optical detector 240 when the non-confocal point optical detector 240 calculates a focusing position. Thereafter, when detection of a focusing position by the non-confocal point optical detector 240 is terminated, the mirror 249 is moved to a position indicated by a broken line in the figure, so that a 100% sample image is injected into the confocal point optical detector 232. The position movement of the mirror 243 is controlled by the computer 236, and can be electrically switched.

In this structure, a sample image can be injected into each of the non-confocal point optical detector 240 and the confocal point optical detector 232, without reducing the light amount. Therefore, it is possible to sufficiently obtain a focusing position with respect to a sample of which light amount is insufficient.

Note that the non-confocal point detector system and the confocal point detector system may be provided in a positional relationship as shown in FIG. 7. In this case, the mirror 224 moves.

Sixth Embodiment

The sixth embodiment is arranged such that a two-dimensional area sensor is used for an optical detector, to change the area to be taken in. In this manner, each of non-confocal point data and confocal point data can be detected.

Figure 15A:
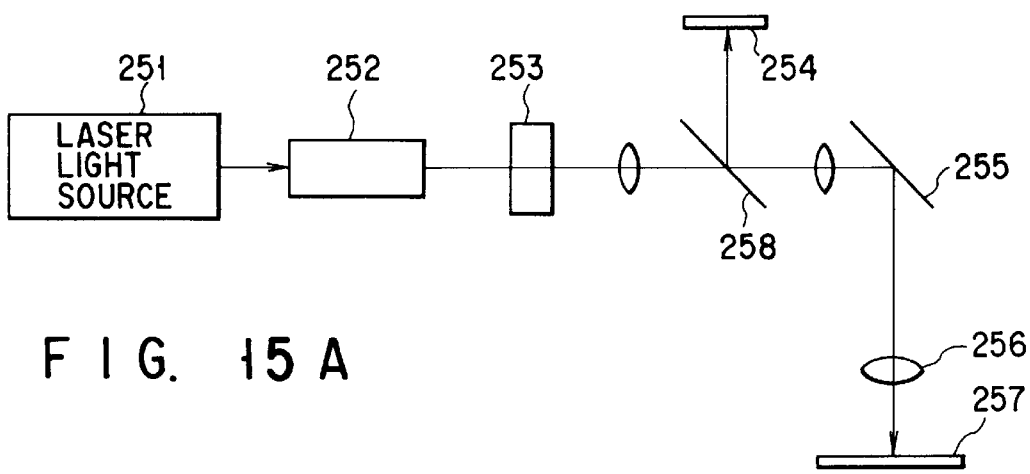
FIGS. 15A and 15B are views schematically showing a main part of a sixth embodiment of the present invention.

FIG. 15A shows a circuit configuration for focusing point detection realized with use of a two-dimensional area sensor as described above. A laser beam from a laser light source 251 is arranged so as to pass through a beam expander 252, an X-direction galvanic mechanism 253, a Y-direction galvanic mechanism 255, and an objective lens 256, and is thus injected into a sample 257. Reflected light from the sample 257 is supplied to a two-dimensional area sensor 254 by means of a mirror 258.

Figure 15B:
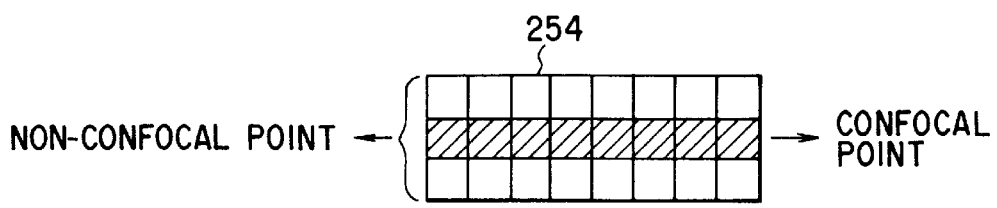

In this case, the two-dimensional area sensor 254 is constituted, for example, by a CCD, and as shown in FIG. 15B, the area sensor is provided with several lines each consisting of a plurality of image pickup elements. Confocal point data is detected by taking in a brightness output from image pickup elements equivalent to one pixel, among an arbitrary line (indicated by broken lines in the figure) of the two dimensional area sensor 254. On the other hand, non-confocal point data is obtained by adding a brightness output from the image pickup elements equivalent to one pixel, among an arbitrary line (indicated by broken lines in the figure) of the two-dimensional area sensor 254, and a brightness output from image pickup elements equivalent to at least pixels arranged in the upper and lower sides of the pixels. Specifically, in correspondence with the magnification of the objective lens 256, the brightness outputs from the image pickup elements equivalent to pixels arranged in the upper and lower sides of are arranged, for example, such that the pixels arranged in the upper and lower sides are added if the objective magnification is low, while addition of the pixels arranged in the upper and lower sides is taken as the smallest unit if the magnification is high.

In this structure, a focusing position can be obtained by one optical detector, by obtaining confocal point data and non-confocal point data to pursue the focusing position.

In this case, it is natural that all the pixels need not be used, but use of an arbitrary pixel is sufficient. Although the present embodiment has been explained, supposing line scanning, a spot or a slight and small two-dimensional area is applicable.

Seventh Embodiment

Figure 16:
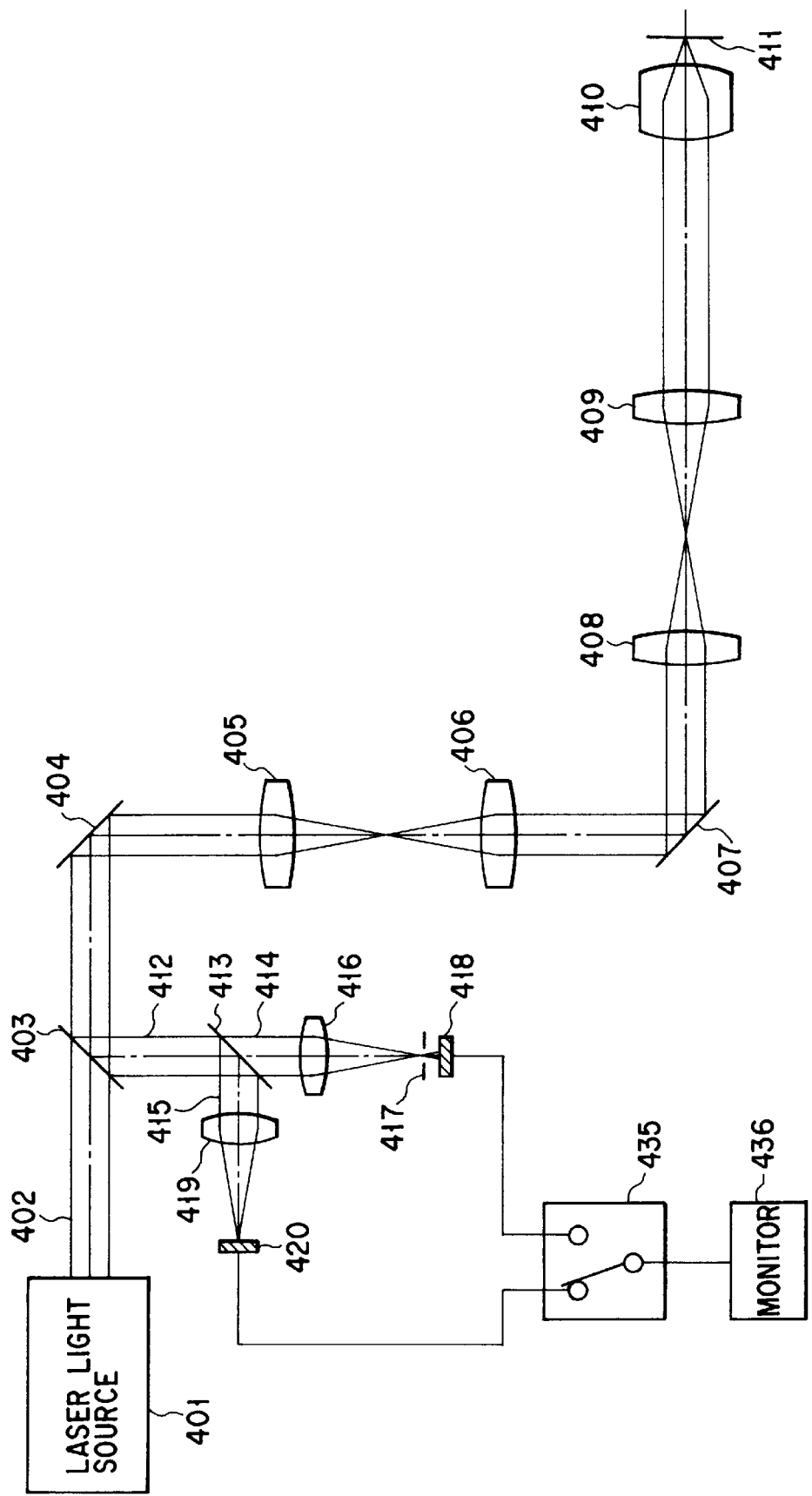
FIG. 16 is a view showing an optical system and explaining a seventh-embodiment of the present invention.

The seventh embodiment of the present invention is constructed as shown in the optical system configuration in FIG. 16. This embodiment comprises a light source, an objective lens 410, two optical deflect members, a confocal diaphragm, beam splitters 403 and 413, a non-confocal point image detector 420, a monitor 436, and a switch 35. The light source is, for example, a laser light source 401. The objective lens 410 converges a laser beam 402 generated from the laser light source 401 onto a sample 411. The two optical deflect members are, for example, galvanometer mirrors 404 and 407 provided between the objective lens 410 and the laser light source 401, and respectively change the incident angles of the light to enter into the objective lens 410, in perpendicular directions, to scan the sample 411. The confocal diaphragm is, for example, a pin hole 417. The confocal point image detector 418 detects light passing through the pin hole 417. The beam splitters 403 and 413 are provided between the galvanometer mirrors 404 and 407 and the pin hole 417, and divide the light from the sample 411 at a predetermined ratio. The non-confocal point image detector 420 detects light divided by the beam splitters 403 and 413. The monitor 436 displays image signals from the detectors 418 and 420. The switch 35 electrically switches the image signals from the detectors 418 and 420.

In addition to the above structure, the present embodiment comprises pupil transmit lenses 405 and 406 provided on a light path between the galvanometer mirrors 404 and 407, a pupil projection lens 408 provided on a light path between the galvanometer mirror 407 and the objective lens 410, a imaging lens 409, a converging lens 416 provided on a light path between the beam splitter 413 and the pin hole 417, and a converging lens 419 provided on a light path between the beam splitter 413 and the detectors 420. Here, the detectors 418 and 420 are those detectors such as photodiodes or photomultipliers, which are capable of detecting zero-dimensional light.

In this structure, the laser beam 402 injected from the laser light source 401 passes through the beam splitter 403, and enters into the galvanometer mirror 404. Here, the laser beam 402 is deflected to scan in the X-direction. In the next, the light beam enters into the galvanometer mirror 407 through the pupil transmit lenses 405 and 406. Here, the laser beam 402 is deflected and scans in the Y-direction.

In the figure, the galvanometer mirrors 404 and 407 are illustrated as deflecting the laser beam 402 in one same direction since the figure is simplified. However, these mirrors are actually arranged so as to scan the sample 411 in the two-dimensional directions of X- and Y-directions.

The laser beam 402 subjected to two-dimensional scanning passes through the pupil projection lens 408 and the imaging lens 409, and enters into the objective lens 410. Further, a laser spot is generated on the sample 411, and the sample 411 is scanned by the laser spot in the two-dimensional directions of x- and Y-directions. The laser beam reflected from the sample 411 passes through the same light path as the light beam passes when it enters, e.g., the reflected laser beam passes through the objective lens 410, the imaging lens 409, the pupil projection lens 408, the galvanometer mirror 407, the pupil transmit lenses 406 and 405, and the pupil transmit lenses 406 and 405, and returns to the beam splitter 403. The detection beam 412 reflected by the beam splitter 403 is divided into detection beams 414 and 415, by the beam splitter 413.

The detection beam 414 is converged onto a point by the converging lens 416, and is diaphragmed by the pin hole 417 provided at the position. Further, a detected confocal point image is obtained by a detector 418. In addition, the detection beam 415 is converged by the converging lens 419, to obtain a non-confocal point image detected by the detector 420.

In addition, the division ratio of the beam splitter 413 is decided on the basis of the light amount diaphragmed by the pin hole 417, and is set to a ratio with which a greater light amount is distributed to the confocal point light path side, i.e., the detection beam 414. Thus, the detection beams 414 and 415 respectively have appropriate light amounts.

In the structure as described above, since a component which is mechanically moved is not required for making the mirrors 471 and 474 freely move forwards and backwards, unlike in a conventional apparatus, a confocal point image and a non-confocal point image can be simultaneously detected with a low price and a small size. In addition, by switching image signals by the switch 435, the image signals from the detectors 418 and 420 can be easily and immediately selected and displayed as a confocal point image and a non-confocal point image, on the monitor 436.

Eighth Embodiment

Figure 17:
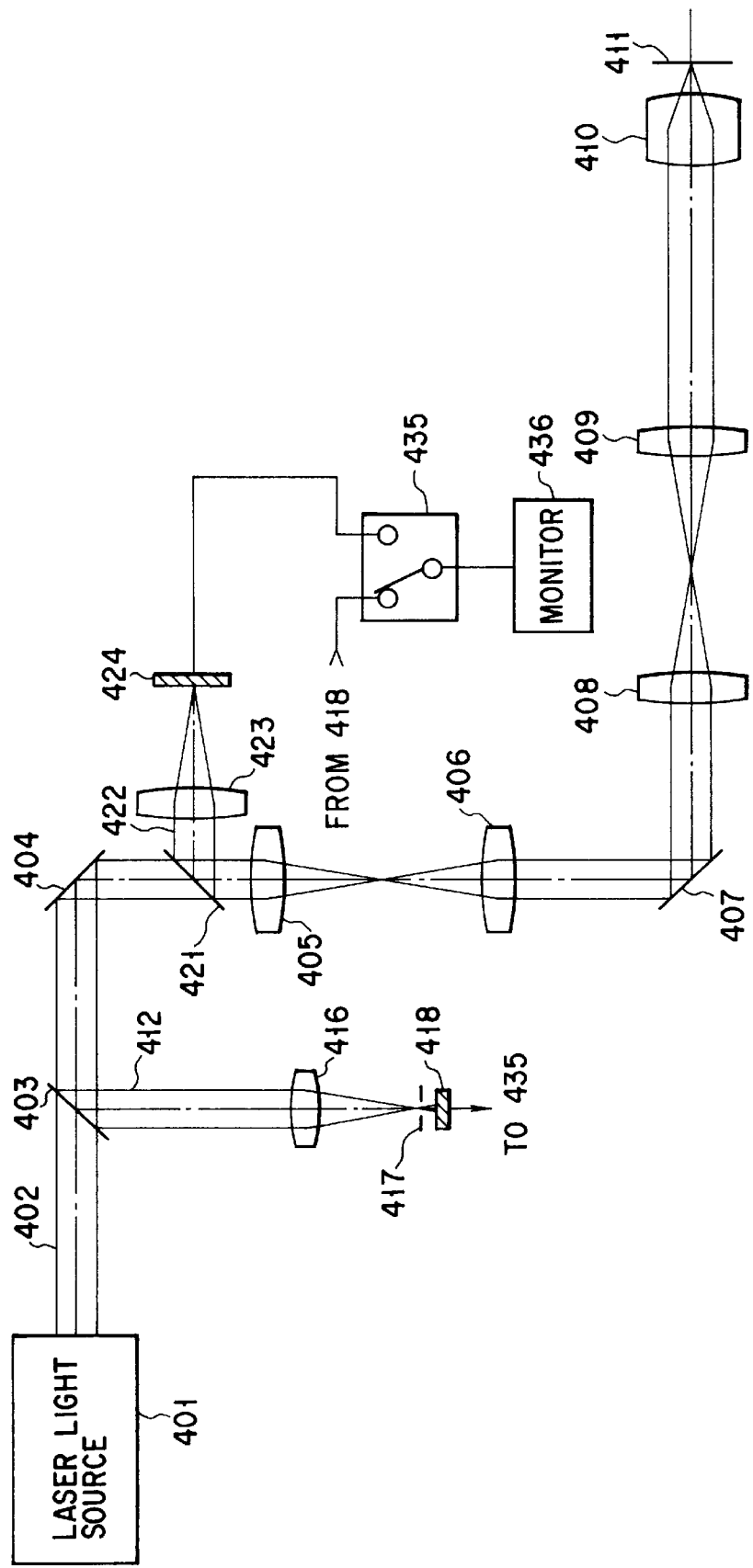
FIG. 17 is a view showing an optical system and explaining an eighth embodiment of the present invention.

The eighth embodiment shown in FIG. 17 is different from the embodiment of FIG. 16 in the following points. The eighth embodiment is not provided with the beam splitter 413 provided between the beam splitter 403 and the converging lens 416, or the detector 420 for detecting the detection beam divided by the beam splitter 413, through the converging lens 419, but is instead provided with a beam splitter 421 on a light path between the galvanometer mirrors 404 and 407, e.g., between the galvanometer mirror 404 and the pupil transmit lens 405. Further, in the eighth embodiment, a non-confocal point image detector 424 is provided so that a detection beam divided by the beam splitter 421 can be detected by the converging lens 423, and a monitor 436 for displaying image signals from the detectors 418 and 424 and a switch 435 for electrically switching the image signals inputted into the monitor 426 from the detectors 418 and 424. The other points are the same as those shown in FIG. 16.

Here, a detector such as a line sensor or the like which is capable of detecting one-dimensional light, or a detector which has a detect port sufficient for detecting light subjected to one-dimensional scanning and which is capable of detecting zero-dimensional light is used as a detector 424.

In the confocal point scanning type optical microscope as constructed above, a laser beam 402 injected from the laser light source 401 passes through the beam splitter 403, and enters into the galvanometer mirror 404. Here, the laser beam 402 is deflected to scan in the X-direction. In the next, the laser beam 402 enters into the galvanometer mirror 407 through the pupil transmit lenses 405 and 406, and the laser beam 402 is hereby deflected so as to scan in the Y-direction. In the figure, the galvanometer mirrors 404 and 407 are illustrated as deflecting the laser beam 402 in one same direction for the purpose of simplifying the figure. However, these mirrors are actually arranged so as to scan the sample 411 in the two-dimensional directions of X- and Y-directions.

The laser beam 402 subjected to two-dimensional scanning passes through the pupil projection lens 408 and the imaging lens 409, and enters into the objective lens 410. Further, a laser spot is generated on the sample 411, and the sample 411 is scanned by the laser spot in the two-dimensional directions of X- and Y-directions. The laser beam reflected from the sample 411 passes through the same light path as the light beam passes when it enters, e.g., the reflected laser beam passes through the objective lens 410, the imaging lens 409, the pupil projection lens 408, the galvanometer mirror 407, the pupil transmit lenses 406 and 405, and the pupil transmit lenses 406 and 405, and returns to the beam splitter 403.

The detection beam 412 reflected by the beam splitter 403 is converged onto a spot by the converging lens 416, and is diaphragmed by the pin hole 417 provided at the position. The converged beam is detected by the detector 418, so that a confocal point image can be obtained.

The detection beam 422 divided by the beam splitter 421 is converged by the converging lens 423, and is detected by the detector 424, so that a non-confocal point image can be obtained.

Here, since the detection beam 422 entering into the detector 424 passes through the galvanometer mirror 404 for only one time, the detector 424 may be a detector which is capable of detecting one-dimensional lights or a detector having a detection port sufficient for detecting light subjected to one-dimensional scanning, as has been explained above.

In this case, if a line sensor is used as the detector 424, the beam is reduced by a pixel when the size of one pixel of the line sensor is smaller than the spot diameter of the beam converged by the converging lens 423. Therefore, an effect equivalent to a confocal diaphragm is obtained. Further, since a line sensor is constituted by disposing pixels in a one-dimensional direction, a confocal point effect is obtained with respect to a component vertical to the scanning direction.

When the size of one pixel of the line sensor is sufficiently large for the spot diameter of the beam, a normal non-confocal point image is obtained. Therefore, both of confocal and non-confocal point effects can be obtained by accordingly selecting a line sensor or a converging lens. Further, in this case, signals from the line sensor can be processed as TV signals if the galvanometer mirror 404 for deflecting light in the Y-direction is scanned at a TV rate.

In addition, the division ratio of the beam splitter 421 is decided on the basis of the light amount diaphragmed by the pin hole 417, and is set to a ratio with which a greater light amount is distributed to the confocal point light path side, i.e., the detection beam 412. Thus, the detection beams 412 and 422 reapectively have appropriate light amounts.

In the structure as described above, since a component which is mechanically moved is not required for making the mirrors 471 and 474 freely move forwards and backwards, unlike in a conventional apparatus, a confocal point image and a non-confocal point image can be simultaneously detected with a low price and a small size. In addition, by switching image signals by the switch 435, the image signals from the detectors 418 and 424 can be easily and immediately selected and displayed as a confocal point image and a non-confocal point image, on the monitor 436.

Ninth Embodiment

Figure 18:
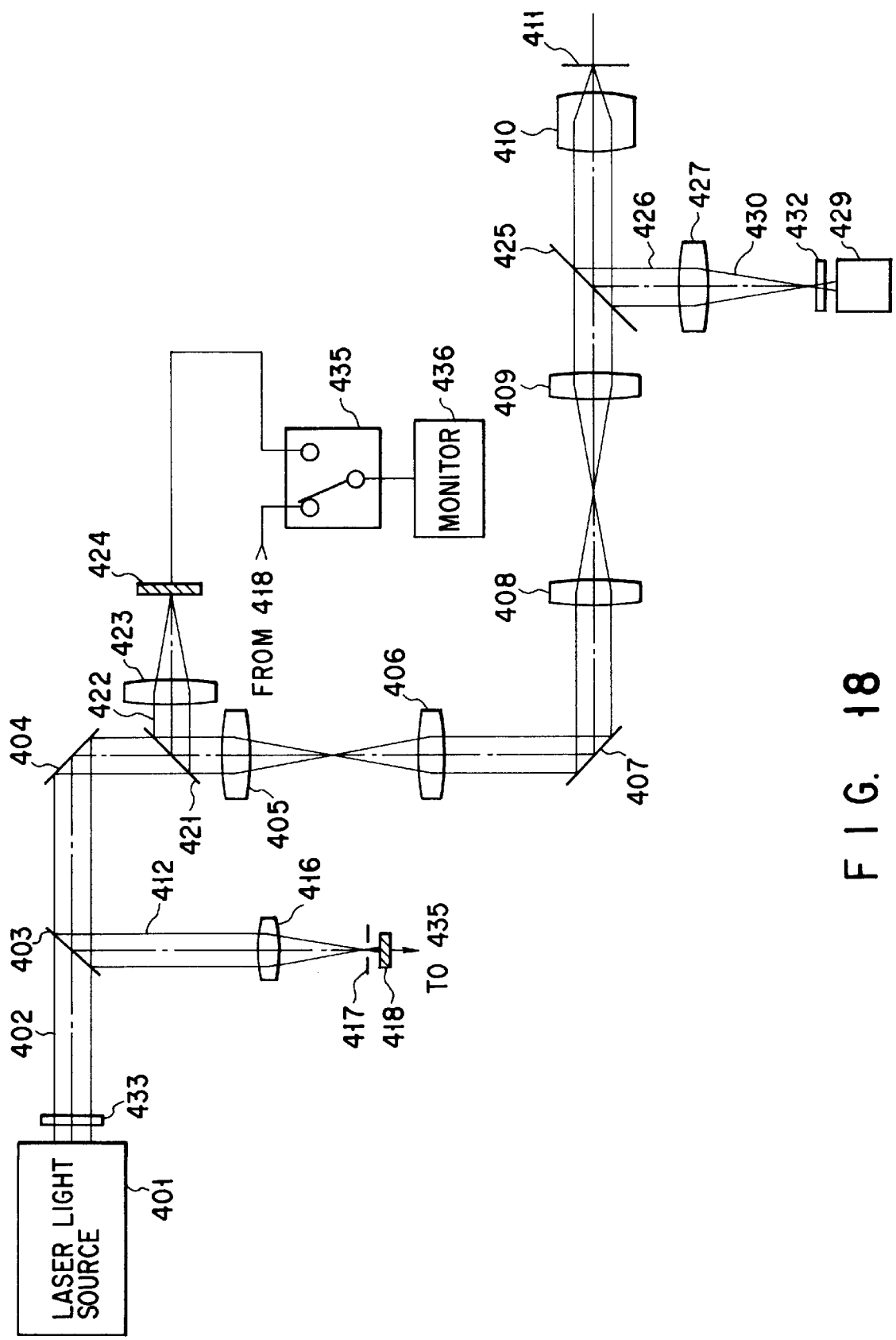

The ninth embodiment of the present invention is constructed by adding the following structure shown in FIG. 18 to the structure shown in FIG. 17. Specifically, a shutter 433 is provided on a light path between a laser light source 401 and a beam splitter 403. Light from a white light source 429 is made pass through a shutter 432 and a converging lens 427, and is injected onto a sample 411 by a beam splitter 425 provided on a light path between an imaging lens 409 and an objective lens 410. Light reflected from the sample 411 is detected by an optical detector 424. Note that references 426 and 430 respectively denotes detection beams. In this case, it is necessary to use a line sensor consisting of one-dimensional CCD, or a detector which has a detection port sufficient for detecting light subjected to dimensional scanning and which is capable of detesting zero-dimensional light, is for example, as the optical detector 424. Note that the shutters 432 and 433 are provided in order to prevent two reflected light beams from returning to the optical detector 424 at the same time, because two reflected light beams from two light sources 401 and 429 return when the laser light source 401 and the white light source 429 are lightened simultaneously. In the arrangement of FIG. 18, a laser light source 401 is selected with the shutter 433 opened and shutter 432 closed, it is possible to obtain a confocal point image and non-confocal point image as in the case of FIG. 17. Further, the shutters 433 and 432 are closed and opened, respectively, and, if white color laser light sources 401 and 429 are selected, it is possible to obtain a reflected illumination image.

Tenth Embodiment

The tenth embodiment of the present invention shown in PIG. 19 is different from FIG. 16 in that the following structure is added in place of providing the beam splitter 413 of FIG. 16 provided between the beam splitter 403 and the converging lens 416 and the detector 420 of FIG. 16 for detecting a detection beam divided by the beam splitter 413 through the converging lens 419. Specifically, a non-confocal point image detector 428 is provided so that a divided detection beam can be detected through the converging lens 427 by the beam splitter 425 provided on a light path between the imaging lens 409 and the objective lens 410, and the tenth embodiment further comprises a monitor 436 for displaying image signals form the detectors 418 and 428, and a switch 435 for electrically switching image signals inputted to the monitor 436 from the detectors 418 and 428.

The detector 428 is a detector such as a CCD or the like which is capable of detecting two-dimensional light, or a detector which has a detection port sufficient for detecting light subjected to two-dimensional scanning and which is capable of detecting zero-dimensional light. The other points are the same as those of the embodiment shown in FIG. 16.

In this structure, the laser beam 402 injected from the laser light source 401 passes through the beam splitter 403, and enters into the galvanometer mirror 404. Here, the laser beam 402 is deflected to scan in the X-direction. In the next, the light beam enters into the galvanometer mirror 407 through the pupil transmit lenses 405 and 406.

Here, the laser beam 402 is deflected and scans in the Y-direction. In the figure, the galvanometer mirrors 404 and 407 are illustrated as deflecting the laser beam 402 in one same direction since the figure is simplified. However, these mirrors are actually arranged so as to scan the sample 411 in the two-dimensional directions of X- and Y-directions.

The laser beam 402 subjected to two-dimensional scanning passes through the pupil projection lens 408 and the imaging lens 409, and enters into the objective lens 410. Further, a laser spot is generated on the sample 411, and the sample 411 is scanned by the laser spot in the two-dimensional directions of X- and Y-directions. The laser beam reflected from the sample 411 passes through the same light path as the light beam passes when it enters, e.g., the reflected laser beam passes through the objective lens 410, the imaging lens 409, the pupil projection lens 408, the galvanometer mirror 407, the pupil transmit lenses 406 and 405, and the pupil transmit lenses 406 and 405, and returns to the beam splitter 403. The detection beam 412 reflected by the beam splitter 403 is converged onto a point by the converging lens 416, and is diaphragmed by a pin hole 417 provided at the position of the point. Further, a detected confocal point image is obtained by the detector 418.

The detection beam 426 divided by the beam splitter 425 is converged by the converging lens 427, and is detected by the detector 428, to obtain a non-confocal point image. The position of the beam splitter 425 is not limited to the position shown in the figure, as long as the beam splitter 425 is positioned between the galvanometer mirror 407 and the objective lens 410. Further, if the galvanometer mirror 407 as an optical deflector is a mirror which is capable of performing scanning with a video rate, detection can be performed with use of a normal TV camera.

In addition, the division ratio of the beam splitter 413 is decided on the basis of the light amount diaphragmed by the pin hole 417, and is set to a ratio with which a greater light amount is distributed to the confocal point light path side, i.e., the detection beam 414. Thus, the detection beams 412 and 426 respectively have appropriate light amounts.

In the structure as described above, since a component which is mechanically moved is not required for making the mirrors 471 and 474 freely move forwards and backwards, unlike in a conventional apparatus, a confocal point image and a non-confocal point image can be simultaneously detected with a low price and a small size. In addition, by switching image signals by the switch 435, the image signals from the detectors 418 and 428 can be easily and immediately selected and displayed as a confocal point image and a non-confocal point image, on the monitor 436.

Eleventh Embodiment

Figure 19:
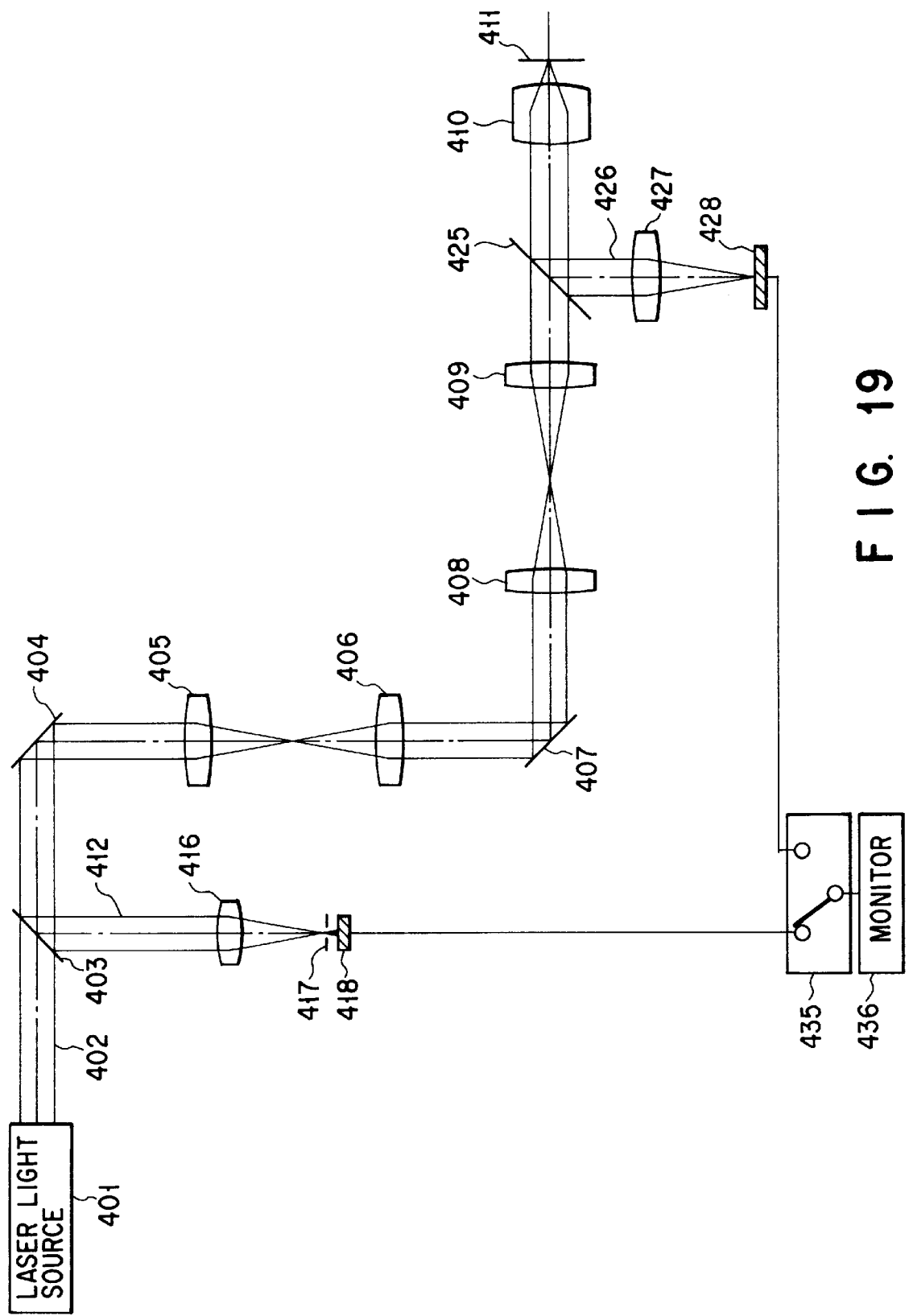
FIG. 19 is a view showing an optical system and explaining a modification example of a ninth embodiment of the present invention.

As shown in FIG. 19, the tenth embodiment of the present invention is constructed by adding the following structure to the embodiment of FIG. 16, in place of providing the beam splitter 413 of FIG. 16 provided between the beam splitter 403 and the converging lens 416 and the detector 420 of FIG. 16 for detecting a detection beam divided by the beam splitter 413 through the converging lens 419.

Specifically, a shutter 433 is provided on a light path between a laser light source 401 and a beam splitter 403. Light from a white light source 429 is made pass through a shutter 432 and a converging lens 427, and is injected onto a sample 411 by a beam splitter 425 provided on a light path between an imaging lens 409 and an objective lens 410. Further an half-mirror 430 is provided on a light path between the converging lens 427 and the shutter 432, thereby to detect reflected light by means of the detector 431. The eleventh embodiment further comprises a monitor 436 for displaying image signals form the detectors 418 and 431, and a switch 435 for electrically switching image signals inputted to the monitor 436 from the detectors 418 and 431. The other points are the same as those of the embodiment shown in FIG. 17. In this case, the detector 431 may be a detector such as a CCD or the like which is capable of detecting two-dimensional light.

Note that the shutters 432 and 433 are provided in order to prevent two reflected light beams from returning to the optical detector 431 at the same time, because two reflected light beams from two light sources 401 and 429 return when the laser light source 401 and the white light source 429 are lightened simultaneously.

Figure 20:
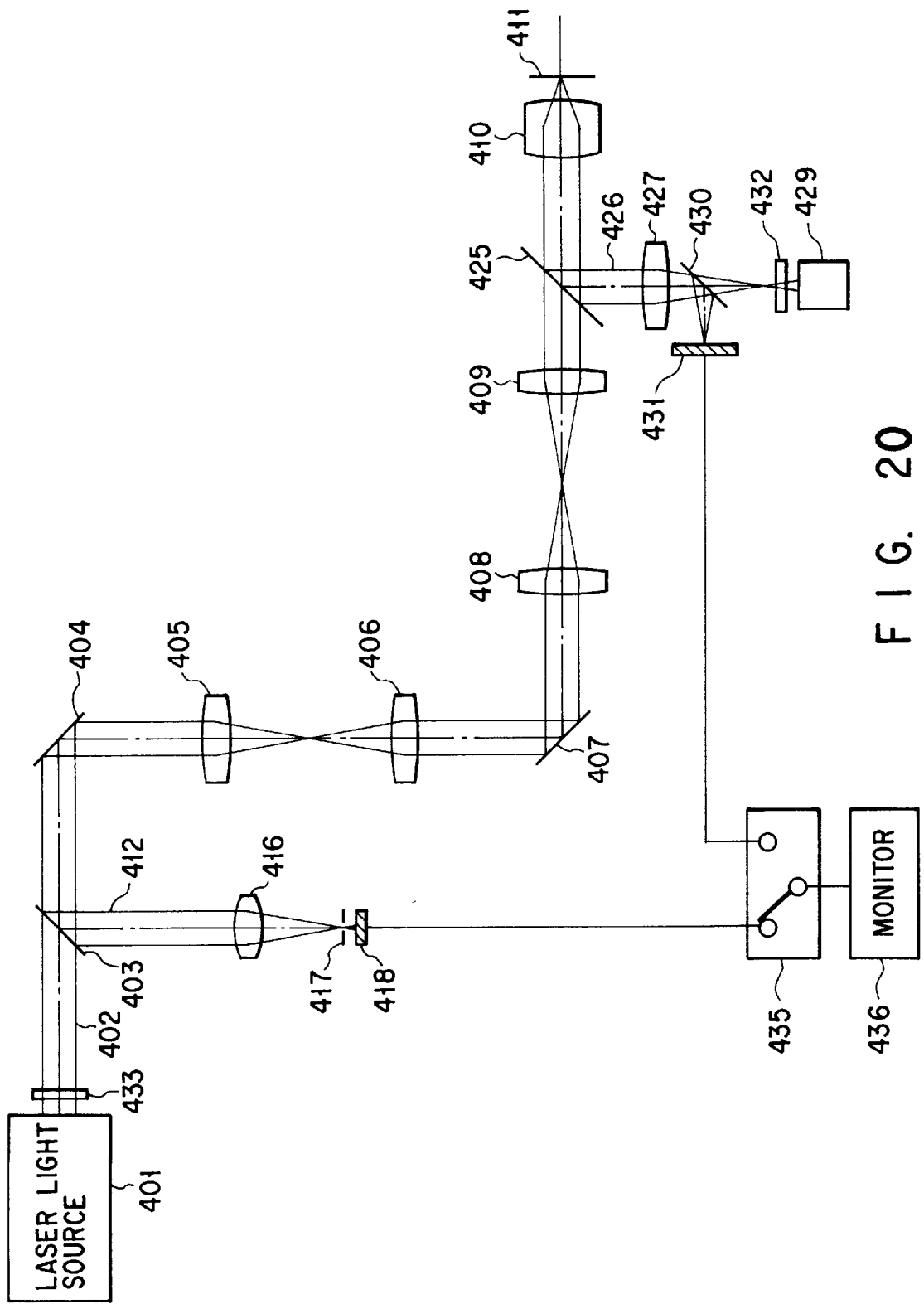

In the structure shown in FIG. 20, the laser beam 402 injected from the laser light source 401 passes through the beam splitter 403, and enters into the galvanometer mirror 404. Here, the laser beam 402 is deflected so as to scan in the X-direction. In the next, the light beam enters into the galvanometer mirror 407 through the pupil transmit lenses 405 and 406. Here, the laser beam 402 is deflected and scans in the Y-direction.

In the figure, the galvanometer mirrors 404 and 407 are illustrated as deflecting the laser beam 402 in one same direction since the figure is simplified. However, these mirrors are actually arranged so as to scan the sample 411 in the two-dimensional directions of X- and Y-directions. The laser beam 402 subjected to two-dimensional scanning passes through the pupil projection lens 408 and the imaging lens 409, and enters into the objective lens 410. Further, a laser spot is generated on the sample 411, and the sample 411 is scanned at the laser spot in the two-dimensional directions of X- and Y-directions. The laser beam reflected from the sample 411 passes through the same light path as the light beam passes when it enters, e.g., the reflected laser beam passes through the objective lens 410, the imaging lens 409, the pupil projection lens 408, the galvanometer mirror 407, the pupil transmit lenses 406 and 405, and the pupil transmit lenses 406 and 405, and returns to the beam splitter 403. The detection beam 412 reflected by the beam splitter 403 is converged onto a point by the converging lens 416, and is diaphragmed by a pin hole 417 provided at the position of the point.

Further, a detected confocal point image is obtained by the detector 418. In addition, the light emitted from the white light source 429 passes through the half-mirror 430, and drop-illuminates the sample 411 through the imaging lens 427, the beam splitter 425, and the objective lens 410. Then, this light returns through the same light path, and is reflected by the half-mirror 430. The reflected light is detected by the detector 431, to obtain a drop illumination image of a normal microscope. Here, the illumination light from the laser light source 401 and the illumination light from the white light source 429 can be selected by the shutters 432 and 433. When a confocal point image and a non-confocal point image are obtained, the shutter 433 is opened while the shutter 432 is closed, thereby selecting the laeor light source 401. When a drop illumination image of a normal microscope is obtained, the shutter 433 is closed while the shutter 432 is opened, thereby selecting the white light source 429.

However, when the laser light source 401 is selected, the present embodiment has the same structure as the tenth embodiment, so that a non-confocal point image can be obtained by the detector 431. Specifically, by making selection as to the illumination light, a non-confocal point image and a drop illumination image of a normal microscope can be obtained by the detector 431. In addition, the position of the beam splitter 425 is not limited as long as the beam splitter 425 is positioned between the galvanometer mirror 407 and the objective lens 410. Here, when both of a drop illumination image of a normal microscope and a non-confocal point image are detected by the detector 431, a circuit for separately processing signals from the detector 431 may be provided.

Note that a TV camera is normally used for detecting a drop illumination image of a normal microscope. Further, if a deflector which is capable of scanning with a video rate is used as an optical deflector, a non-confocal point image can be detected with use of a normal TV camera. In addition, the division ratio of the beam splitter 425 is set to a ratio with which a greater light amount is distributed to the contocal point light path side, i.e., the detection beam 414, in view of the light amount diaphragmed by the pin hole 417. Thus, the detection beams 412 and 426 respectively have appropriate light amounts.

In the structure as described above, since mechanically movable components are not substantially required, a confocal point image, a drop illumination image of a normal microscope, and a non-confocal point image can be selected by only switching illumination light sources and electric signals, with a low price and a small size. In addition, a confocal point image, a drop illumination image of a normal microscope, and a non-confocal point image can be selected easily and immediately.

Modification Example

Although the first to eleventh embodiments have been explained with use of galvanometer mirrors as optical deflectors, the optical deflectors are not limited hereto. For example, it is possible to use a polygon mirror, an acoustic optical element, or the like can be used. In addition, any types of beam splitters including a prism type, a plate type, and the like may be used as long as they function as beam splitters.

Twelfth Embodiment

The seventh to eleventh embodiments described above are used to obtain a confocal point image and/or a non-confocal point image. However, by combining these optical systems for obtaining a confocal point image and/or a non-confocal point image and by providing a signal processor 440, the focusing point detection as achieved in the first to sixth embodiments can be realized. This will be explained as the twelfth embodiment of the present invention, with reference to FIG. 21. Specifically, by detecting light which does not pass through a confocal point diaphragm, with use of the detector 418, characteristics of a focusing point (i.e., a position indicated by a reference b in FIG. 6) and brightness are measured in the confocal mode, and are supplied to the signal processor 440. By the signal processor 440, the position where the brightness is a maximum value in the characteristic a is determined as a focusing point. As for the focusing point, the objective lens 410 and/or the sample 411 is subjected to focusing control, and therefore, the objective lens 410 and/or the stage mounting the sample 411 is moved and controlled. Note that the signal processor 440 has a function as a switch 435, and is capable of supplying a confocal point image and/or a non-eontocal point image to the monitor 436.

Thirteenth Embodiment

An automatic focusing point detection apparatus for a microscope according to the thirteenth embodiment of the present invention will be explained. FIGS. 22 and 23 are views showing the structures of the optical system of the embodiment. This embodiment comprises a light source, an objective lens 510, two optical deflect members such as galvanometer mirrors 504 and 507, a pin hole mirror 517 as a high reflection mirror, a first detector 518, a relay optical system 519, a second detector 520, an adder 523, a monitor 526, and a switch 525. The laser light source S01 is a light source. The objective lens 510 converges a laser beam 502 generated from the laser light source 501, onto a sample 511. The two optical deflect members are provided between the objective lens 510 and the laser light source 501, and scan the sample 511 in directions perpendicular to each other, by changing the incident angle of light entering into the objective lens 510. The pin hole mirror 517 is provided at the converging position of the converging lens 516, has a confocal diaphragm for diaphragming light from the sample 511, and reflects efficiently that portion of light which cannot be diaphragmed by the confocal diaphragm. The first detector 518 detects light passing through the pin hole mirror 517. The relay optical system 519 converges light reflected by the pin hole mirror 517. The second detector 520 is provided at a position common to the pin hole mirror 517 with respect to the relay optical system 519, and detects light reflected by the pin hole mirror 517. The adder 523 adds together image outputs 521 and 522 from the first and second detectors 518 and 520. The monitor displays the image output 521 from the first detector 518 and an image output 524 from the adder 523. The switch 525 electrically switches the image output 521 from the first detector 518 inputted into the monitor 526 and the image output from the adder 523. The pin hole mirror 517 may be constituted by forming a mirror on the surface of a normal pin hole.

In addition to the above structure, the present embodiment comprises pupil transmit lenses 505 and 506 provided on a light path between the galvanometer mirrors 504 and 507, a pupil projection lens 508 provided on a light path between the galvanometer mirror 507 and the objective lens 510, a imaging lens 509, and a converging lens 516 provided on a light path between the beam splitter 513 and the pin hole mirror 517. Here, the detectors 518 and 520 are those detectors such as photodiodes or photomultipliers, which are capable of detecting zero-dimensional light.

In the structure as described above, a laser beam 502 injected from the laser light source 501 passes through the beam splitter 503, and enters into the galvanometer mirror 504. Here, the laser beam 502 is deflected so as to scan in the X-direction. In the next, the light beam thus subjected to scanning enters into the galvanometer mirror 507 through the pupil transmit lenses 505 and 506. Here, the laser beam 502 is deflected and scans in the Y-direction. In the figure, the galvanometer mirrors 504 and 507 are illustrated as deflecting the laser beam 502 in one same direction for the purpose of simplifying the figure. However, these mirrors are actually arranged so as to scan the sample 511 in the two-dimensional directions of X- and Y-directions.

The laser beam 502 subjected to two-dimensional scanning passes through the pupil projection lens 508 and the imaging lens 509, and enters into the objective lens 510. Further, a laser spot is generated on the sample 511, and the sample 511 is scanned by the laser spot in the two-dimensional directions of X- and Y-directions. The laser beam reflected from the sample 511 passes through the same light path as the light beam passes when it enters, e.g., the reflected laser beam passes through the objective lens 510, the imaging lens 509, the pupil projection lens 508, the galvanometer mirror 507, the pupil transmit lenses 506 and 505, and the galvanometer mirror 504, and returns to the beam splitter 503. The detection beam 512 reflected by the beam splitter 503 is converged onto a point by the converging lens 516, and is diaphragmed by the pin hole mirror 517 provided at the position of the point.

Operation of the diaphragm of the pin hole mirror 517 will now be explained with reference to FIGS. 24A to 24C. As shown in FIG. 24B, the incident angle of the detection light 512 with respect to the pin hole mirror 517 is previously set to a predetermined angle θ so that the reflected light of the detection light 512 can be detected by the second detector 520.

FIG. 24A shows an example in which the sample 511 is more distant from the objective lens 510 than the focusing position of the objective lens 510, and the detection light 512 is converged in front of the pin hole mirror 517. In this case, most part of the detection light 512 doe not passes through the pin hole, but is reflected by the pin hole mirror 517 and is converged by the relay optical system 519. The light converged by the system 519 is detected by the second detector 520 provided at a position common to the pin hole mirror 517 with respect to the relay optical system 519.

FIG. 24C shows an example in which the sample 511 is positioned at the focusing position of the objective lens 510, and the detection light 512 is converged at the pin hole of the pin hole mirror 517. In this case, the detection light 512 directly passes through the pin hole and is detected by the first detector 518.

FIG. 24C shows an example in which the sample 511 is positioned closer to the objective lens 510 than the focusing position of the objective lens 510, and the detection light 512 is converged behind the pin hole mirror 517. In this case, the detection light 512 does not pass through the pin hole, but is reflected by the pin hole mirror 517 and is converged by the relay optical system 519. The converged light is detected by the second detector provided at a position common to the pin hole mirror 517 with respect to the relay optical system. The second detector 520 has a light receive surface sufficient for detecting light defocused by the pin hole mirror 517.

As shown in FIG. 23, the image output 521 detected by the first detector 518 is of a confocal point image, and the relationship between the movement amount of the objective lens 510 in the direction toward the sample 511 and the image output 521 of the first detector 518 is shown in FIG. 25.

In addition, the detection beam 512 which does not pass through the pin hole of the pin hole mirror 517 but is reflected by the pin hole mirror 517 is detected by the second detector 520 as described above. The relationship between the movement amount of the objective lens 510 in the direction toward the sample 511 and the image output 522 of the first detector 520 is shown in FIG. 25.

Therefore, by inputting the image output 522 of the second detector 520 and the image output 521 of the first detector 518 into the adder 523, as shown in FIG. 23, a non-confocal point image output 524 is obtained. The relationship between the movement amount of the objective lens 510 in the direction toward the sample 511 and the image output 524 of the adder 523 is shown in FIG. 27.

The detection beam 414 is converged onto a point by the converging lens 416, and is diaphragmed by the pin hole 417 provided at the position. Further, a detected confocal point image is obtained by a detector 418. In addition, the detection beam 415 is converged by the converging lens 419, to obtain a non-confocal point image detected by the detector 420.

In order to match the gains of the image output 521 of the first detector 518 with the image output 522 of the second detector 520, a gain device may be provided in a stage before addition is carried out by the adder 523.

In addition, the shape of the pin hole formed in the pin hole mirror 517 is not limited to a true circle. Specifically, although the pin hole mirror 530 shown in FIG. 28A in of a type having pin hole shaped in a true circle, the pin hole of this type of pin hole mirror 530 is viewed like an oval when the mirror is inclined by an angle θ°. As a result, the light amount to be detected by the first detector is reduced.

Figure 28B:
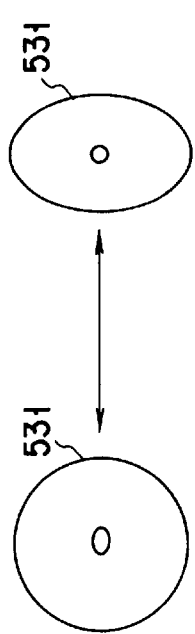

Therefore, in order that the light amount to be detected by the first detector 518 is maximized when the pin hole mirror 531 shown in FIG. 28B is inclined by an angle θ°, the pin hole may be previously formed to have an oval shape so that the pin hole is viewed as a true circle when the mirror is provided at an angle θ° with respect to the optical axis of the detection beam 512. Then, a confocal point image as an image output 521 can be brighter without reducing the light amount to be detected by the first detector 518.

Fourteenth Embodiment

In the above thirteenth embodiment, the relay optical system 519 has been explained as being provided between the pin hole mirror 517 and the second detector 520. However, it is possible to design a structure from which the relay optical system 519 is removed.

In the following, the above-mentioned case will be explained as the fourteenth embodiment of the present invention, with reference to the drawings.

FIG. 29 shows an optical system of this case, and is basically similar to the structure shown in FIG. 22. Therefore, the portions of FIG. 29 which are the same as those shown in FIG. 22 will be denoted by the same references, and detailed explanation of those portions will be omitted herefrom.

In place of providing the relay optical system 519 in the side opposite to the pin hole mirror 517 in FIG. 22, the second detector 520 is provided sufficiently close to the pin hole mirror 517. However, this figure illustrates the pin hole mirror 517 and the second detector 520 being apart from each other, for the purpose of easy understanding.

Here, in order that the second detector 520 does not shield the detection light 512 but has a focusing point equal to a confocal point image, the second detector 520 is provided at a position which is within the focus depth of the optical system of the confocal point scanning type optical microscope and which is considered as equivalent to a case where the second detector 520 is positioned above the pin hole mirror 517.

In this structure, it is possible to more simplify the structure of the confocal point scanning type optical microscope, by reducing the relay optical system 519, while realizing the same operation and advantages as those of the embodiment shown in FIG. 22.

Fifteenth Embodiment

The thirteenth and fourteenth embodiment as described above are used to obtain a confocal point image and/or a non-confocal point image. However, by combining these optical aystema for obtaining a confocal point image and/or a non-confocal point image and by separately providing a signal processor 530, the focusing point detection as achieved in the thirteenth and fourteenth embodiments can be realized. This will be explained as the fifteenth embodiment of the present invention, with reference to FIG. 30. Specifically, by measuring the characteristics of the range of the focusing point (i.e., a position indicated by a reference a in FIG. 6) and the brightness in the non-confocal mode, and by detecting light which is made pass through a confocal point diaphragm, with use of the detector 518, characteristics of a focusing point (i.e., a position indicated by a reference b in FIG. 6) and brightness are measured in the confocal mode, and are supplied to the signal processor 530. By the signal processor 530, the position where the brightness is a maximum value in the characteristic a is determined as a focusing point. As for the focusing point, the objective lens 510 and/or the sample 511 is subjected to focusing control, and therefore, the objective lens 510 and/or the stage mounting the sample 511 is moved and controlled. Note that the signal processor 530 has a function as a switch 525, and is capable of supplying a confocal point image and/or a non-confocal point image to the monitor 526.

As has been described above, according to the present invention, it is possible to provide a focusing point detect method and a microscope by which focusing adjustment can be carried out accurately and rapidly.

Further, according to the present invention, it is possible to provide a microscope which is capable of simultaneously detecting both a confocal point image and a non-confocal point image and is capable of making easy and immediate selection between a confocal point image and a non-confocal point image.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. A method of detecting a focusing point for a microscope including an optical system having a non-confocal detector for detecting a non-confocal point and a confocal detector for detecting a confocal point, the method comprising:

a step of detecting a range of the focusing point in accordance with the non-confocal point detected by the non-confocal point detector; and a step of detecting the focusing point in accordance with the confocal point detected by the confocal point detector in the detected range of the focusing point.

2. A microscope comprising:

a light source;

an objective lens for converging light emitted from the light source onto a sample;

an optical deflection member, provided between the light source and the objective lens, for scanning the sample in directions perpendicular to each other by changing an incident angle of light entering into the objective lens;

first optical detection means for detecting light from the sample via a confocal point diaphragm;

second optical detection means for detecting light from the sample which does not pass through the confocal point diaphragm; and image detection means for detecting a confocal point image signal of the sample in accordance with the light detected by the first optical detection means, and for detecting a non-confocal point image signal of the sample based on the light detected by the second optical detection means.

3. A microscope comprising:

a light source;

an objective lens for converging light emitted from the light source onto a sample;

an optical deflection member, provided between the light source and the objective lens, for scanning the sample in directions perpendicular to each other by changing an incident angle of light entering into the objective lens;

first optical detection means for detecting light from the sample via a confocal point diaphragm;

second optical detection means for detecting light from the sample which does not pass through the confocal point diaphragm; and image detection means for detecting a confocal point image signal of the sample in accordance with the light detected by the first optical detection means, for detecting an image signal based on light reflected by the confocal point diaphragm, and for detecting a non-confocal point image signal by adding the image signal and the confocal point image signal.

4. A microscope comprising:

a light source;

an objective lens for converging light emitted from the light source onto a sample;

first optical detection means for detecting light from the sample via a confocal point diaphragm;

second optical detection means for detecting light from the sample which does not pass through the confocal point diaphragm; and focusing point detection means for detecting a range of a focusing point in accordance with the light detected by the second optical detection means, and for detecting the focusing point in accordance with the light detected by the first optical detection means in the detected range of the focusing point.

5. A microscope according to claim 4, further comprising:

an optical deflection member, provided between the light source and the objective lens, for scanning the sample in directions perpendicular to each other by changing an incident angle of light entering into the objective lens; and image detection means for detecting a confocal point image signal of the sample in accordance with the light detected by the first optical detection means, and for detecting a non-confocal point image signal of the sample based on the light detected by the second optical detection means.

6. A microscope according to claim 4, further comprising:

an optical deflection member, provided between the light source and the objective lens, for scanning the sample in directions perpendicular to each other by changing an incident angle of light entering into the objective lens; and image detection means for detecting a confocal point image signal of the sample in accordance with the light detected by the first optical detection means, for detecting an image signal based on light reflected by the confocal point diaphragm, and for detecting a non-confocal point image signal by adding the image signal and the confocal point image signal.

7. A microscope according to claim 4, wherein the second optical detection means comprises means for detecting a state in which a brightness output thereto is maintained at a constant level at a maximum value to thereby detect a non-confocal point, and the first optical detection means comprises means for detecting a state in which a brightness output thereto is a maximum value to thereby detect a confocal point.

8. A microscope according to claim 4, further comprising means for selectively switching between the first optical detection means and the second optical detection means.

9. A microscope according to claim 4, further comprising means for using the focusing point detected by the focusing point detection means to move and control at least one of the objective lens and a member on which the sample is mounted.

10. A microscope according to claim 4, further comprising light splitting means for splitting the light from the sample so as to provide the first optical detection means with light via the confocal point diaphragm and to provide the second optical detection means with light which does not pass through the confocal point diaphragm.

11. A microscope according to claim 4, wherein the confocal point diaphragm comprises means for changing a diameter of a pin hole through which light from the sample passes or an area for receiving light from the sample.

12. A microscope according to claim 5, further comprising a monitor system for selectively displaying the confocal point image signal and the non-confocal point image signal detected by the image detecting means.

13. A microscope according to claim 5, wherein the confocal point diaphragm comprises a high reflection member.

* * * * *